United States Patent
Vikberg et al.

(10) Patent No.: US 10,271,259 B2
(45) Date of Patent: Apr. 23, 2019

(54) METHOD AND ARRANGEMENT IN A COMMUNICATION SYSTEM

(71) Applicant: TELEFONAKTIEBOLAGET L M ERICSSON (PUBL), Stockholm (SE)

(72) Inventors: Jari Vikberg, Järna (SE); Paul Schliwa-Bertling, Ljungsbro (SE); Tomas Hedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 244 days.

(21) Appl. No.: 14/781,636

(22) PCT Filed: Apr. 4, 2014

(86) PCT No.: PCT/SE2014/050414
§ 371 (c)(1),
(2) Date: Oct. 1, 2015

(87) PCT Pub. No.: WO2014/168560
PCT Pub. Date: Oct. 16, 2014

(65) Prior Publication Data
US 2016/0066245 A1  Mar. 3, 2016

Related U.S. Application Data

(60) Provisional application No. 61/809,668, filed on Apr. 8, 2013.

(51) Int. Cl.
*H04W 76/27* (2018.01)
*H04W 36/36* (2009.01)
(Continued)

(52) U.S. Cl.
CPC .......... *H04W 36/36* (2013.01); *H04W 36/14* (2013.01); *H04W 36/22* (2013.01); *H04W 36/24* (2013.01); *H04W 48/18* (2013.01); *H04W 76/27* (2018.02)

(58) Field of Classification Search
None
See application file for complete search history.

(56) References Cited

U.S. PATENT DOCUMENTS

2011/0110300 A1  5/2011  Sachs et al.
2012/0324100 A1  12/2012  Tomici et al.
(Continued)

OTHER PUBLICATIONS

3GPP TSG-RAN WG2 Meeting #81-BIS, on CN baseline for WLAN/3GPP Radio Interworking solutions, R2-130993, Broadcom Corporation, Apr. 15-19, 2013.
(Continued)

*Primary Examiner* — Nicholas Sloms
(74) *Attorney, Agent, or Firm* — Sage Patent Group

(57) ABSTRACT

In a method performed by a user equipment for controlling radio access network selection and traffic steering for the user equipment in a heterogeneous communication network, said communication network comprising at least said user equipment, at least one radio access network controller node and at least one ANDSF policy server node with which the user equipment is associated, wherein the method includes the steps of adaptively at least partly suspending or activating provided ANDSF policies to enable switching between radio access network control or ANDSF policy control of radio access network selection and traffic steering for the user equipment.

16 Claims, 17 Drawing Sheets

(51) Int. Cl.
*H04W 36/14* (2009.01)
*H04W 48/18* (2009.01)
*H04W 36/22* (2009.01)
*H04W 36/24* (2009.01)

(56) References Cited

U.S. PATENT DOCUMENTS

| | | | |
|---|---|---|---|
| 2014/0064068 A1* | 3/2014 | Horn | H04W 28/0289 370/230 |
| 2014/0226487 A1* | 8/2014 | Forssell | H04W 36/22 370/235 |
| 2015/0172876 A1* | 6/2015 | Mustajarvi | H04W 4/06 455/404.1 |
| 2016/0044567 A1* | 2/2016 | Baghel | H04W 28/08 370/331 |
| 2016/0044586 A1* | 2/2016 | Koskinen | H04W 48/16 370/331 |

OTHER PUBLICATIONS

ETSI TS 124 312 V11.4.0 (Oct. 2012) Universal Mobile Telecommunications System (UMTS); LTE; Access Network Discovery and Selection Function (ANDSF) Management Object (MO) (3GPP TS 24.312 version 11.4.0 Release 11), Oct. 2012, 170 pages.

3GPP TS 23.402 V8.0.0 (Dec. 2007) "3rd Generation Partnership Project; Technical Specification Group Services and System Aspects; Architecture Enhancements for Non-3GPP Accesses (Release 8)", Dec. 2007, 131 pages.

* cited by examiner

METHOD AND ARRANGEMENT IN A COMMUNICATION SYSTEM

This application is a 371 of International Application No. PCT/SE2014/050414, filed Apr. 4, 2014, which claims the benefit of US Provisional Application No. 61/809,668, filed Apr. 8, 2013, the disclosure of which is fully incorporated herein by reference.

TECHNICAL FIELD

The present invention relates to connectivity of a user equipment in radio networks of cellular types and radio access to communication networks that are not cellular. In particular it relates to a user equipment and a method for a user equipment that is adapted for such connectivity and to a radio base station and radio base station method for supporting control of the connectivity from the cellular radio network, and to a policy server node and policy server node method for supporting control of the connectivity from the cellular radio network.

BACKGROUND

At present mobile traffic demands are increasing and will most likely exceed network capacities within the foreseeable future. One manner in which operators are fighting the increasing traffic demands is by utilizing so-called heterogeneous access networks. In heterogeneous access networks, mobile operators can move traffic from the cellular network, where the capacity constraints are most severe, to cheaper shorter-range wireless local area networks e.g. Wi-Fi. One problem with such complex mixes of cellular networks and wireless local area networks is the implementation of efficient policies to control the connectivity behavior of the user equipment when moving between the cellular network and the wireless local area network. The same problem also applies for the case when the user equipment is simultaneously connected to both cellular networks and wireless local area networks. In particular, there is little consistency between mechanisms used by e.g. Wi-Fi operators and those used by cellular operators to control for example network discovery, access or network selection, traffic steering or routing, traffic prioritization, user authentication, roaming capabilities and quality of service (QoS). At present, this also applies for the case when it is the same cellular operator providing the Wi-Fi related information. Roaming capabilities refers to the capabilities of the user equipment moving between the cellular network and the wireless local area network.

The information needed for efficient selection of radio access technology, RAT, is large and is stored partly in the Core Network and partly in the Radio Network, as illustrated in FIG. 1. Almost all Core network information is currently passed on to the radio access network, RAN, mainly when the user equipment, UE, becomes "RRC Connected" and when "Radio Bearers" are established. Examples of transferred information are: cooperating/allowed PLMNs (Public Land Mobile Network), subscription (allowed RATs, QoS rules), services (QoS rules). It can be noted that the information is usually 'translated'. One example is the S1 'Handover Restriction List', which is constructed based on allowed PLMNs and RATs. This information is passed over A/Gb, Iu and S1 interfaces. The RAN has information about e.g. available cells and radio technologies, quality of existing and potential radio links, cell loads including the mix of UEs with different QoS requirements present in different cells, etc. RAN makes a composite decision, taking both Core Network and Radio Network information into account.

In contrast, the current WLAN-3GPP integration method is UE-centric. The UE is provided with (mainly) Core Network information using the ANDSF method, as illustrated in FIG. 2. The content of this information is largely corresponding to the intra-3GPP information, which is passed over the A/Gb, Iu and S1 interfaces. However, the existing interfaces between Core Network and 3GPP RAN have no WLAN-related information at all. Upgrading the Core Network to provide such WLAN-related information may be considered complex, since it affects many nodes.

The so-called Access Network Discovery and Selection Function (ANDSF) provides the possibility to send different policies to the UE for access/network discovery and selection, and traffic steering/routing. The communication between the UE and the ANDSF server is defined as an IP-based S14-interface.

The communication between the UE and the ANDSF server typically consists of the following distinct information elements, access discovery information, inter-system mobility policies, and inter-system routing policies, wherein:

Access Discovery Information (ANDI) is used to provide access discovery information to the UE, which can assist the UE to discover available (3GPP and) non-3GPP access networks without the burden of continuous background scanning.

Inter-System Mobility Policies (ISMP) are policies which guide the UE to select the most preferable 3GPP or non-3GPP access. The ISMP are used for UEs that access a single access technology (3GPP or WLAN) at a time.

Inter-System Routing Policies (ISRP) are policies which guide the UE to select over which access a certain type of traffic or a certain APN shall be routed. The ISRP are used for UEs that access both 3GPP and WLAN simultaneously. FIG. 3 shows the Roaming Architecture for ANDSF (source is FIG. 4.8.1.1-2 in 3GPP TS 23.402).

The above ANDI, ISMP and ISRP have been extended with additional policies in the later 3GPP releases, for example WLAN selection policy (WLANSP) and Inter-APN Routing Policies (IARP) policies.

FIG. 4 finally shows one exemplary mobile network architecture for the case of LTE/EPC and Wi-Fi.

The ANDSF or ANDSF settings or ANDSF policies can supply the UE with the parameters listed above, and thereby provide the UE with policies for the UE selection of RAT/RAN or radio access network selection and traffic steering. These policies are not as sophisticated as those of the cellular RAN/RAT and in particular they are not based on as fresh and detailed information on the RAN conditions as is available in the RAN/RAT.

Consequently, there is a need for methods and arrangements enabling improved control of radio access network selection and traffic steering for user equipment in heterogeneous communication systems.

SUMMARY

It is an object to provide methods and arrangements enabling improved control of radio access network selection and traffic steering in heterogeneous communication networks.

This and other objects are met by embodiments of the proposed technology.

According to a first aspect, there is provided a method performed by a user equipment for controlling radio access network selection and traffic steering for the user equipment in a heterogeneous communication network, which communication network comprises at least the user equipment, at least one network node such as a radio access network controller node and at least one ANDSF policy server node with which the user equipment is associated. The method includes the steps of adaptively at least partly suspending or activating provided ANDSF policies to enable switching between radio access network control and ANDSF policy control of radio access network selection and traffic steering for the user equipment.

According to a second aspect, there is provided a method performed by a network node for enabling controlling radio access network selection and traffic steering for a user equipment served by a radio access network controller node in a heterogeneous communication network. The method includes the step of providing instructions to a connected or idle user equipment enabling the user equipment to at least partly suspend any active ANDSF settings, or to at least partly activate previously suspended ANDSF settings.

According to a third aspect, there is provided a method performed by an ANDSF policy server node for enabling controlling radio access network selection and traffic steering for a user equipment being served by a radio access network controller in a heterogeneous communication network, the user equipment is associated with an ANDSF policy server node. The method includes the step of providing an indication to the user equipment about selected geographical areas in which radio access network selection and traffic steering for the user equipment is controlled by provided ANDSF settings or by the radio access network, the indication enables the user equipment to adaptively suspend or activate ANDSF settings upon entering the selected geographical areas.

According to further aspects there are provided user equipment, network nodes and ANDSF policy server nodes, and computer software programs and carriers enabling the above described aspects.

Embodiments of the proposed technology enables/makes it possible to more efficiently perform radio access network selection and traffic steering for user equipment in heterogeneous communication systems.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

ABBREVIATIONS

Figure 1:
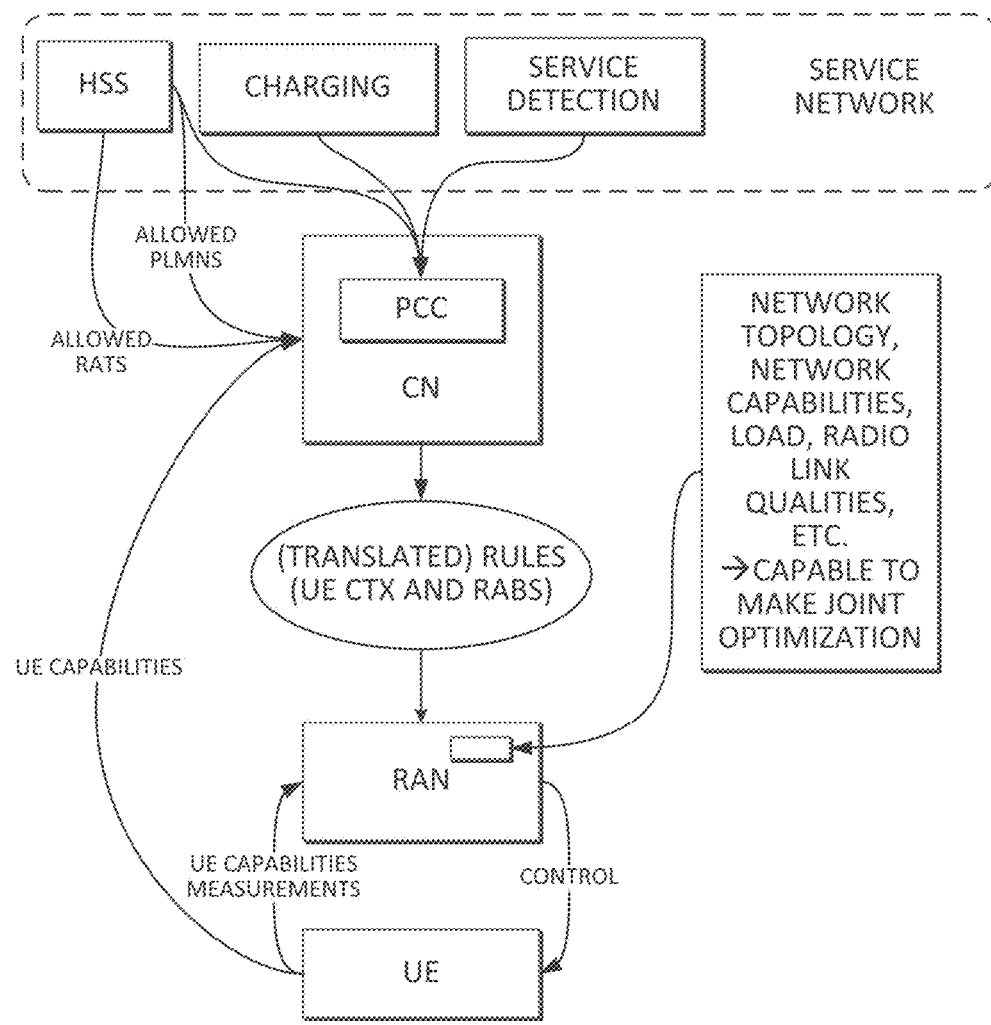
FIG. 1 is an illustration of a legacy intra-3GPP architecture.
Figure 2:
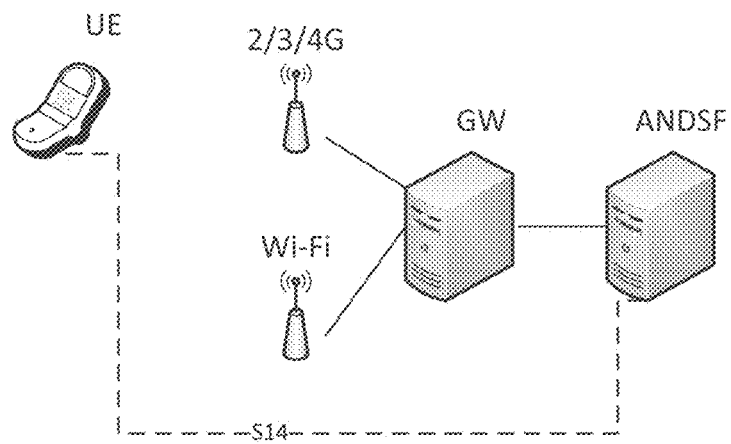
FIG. 2 is an illustration of the functionality of a known ANDSF method.
Figure 3:
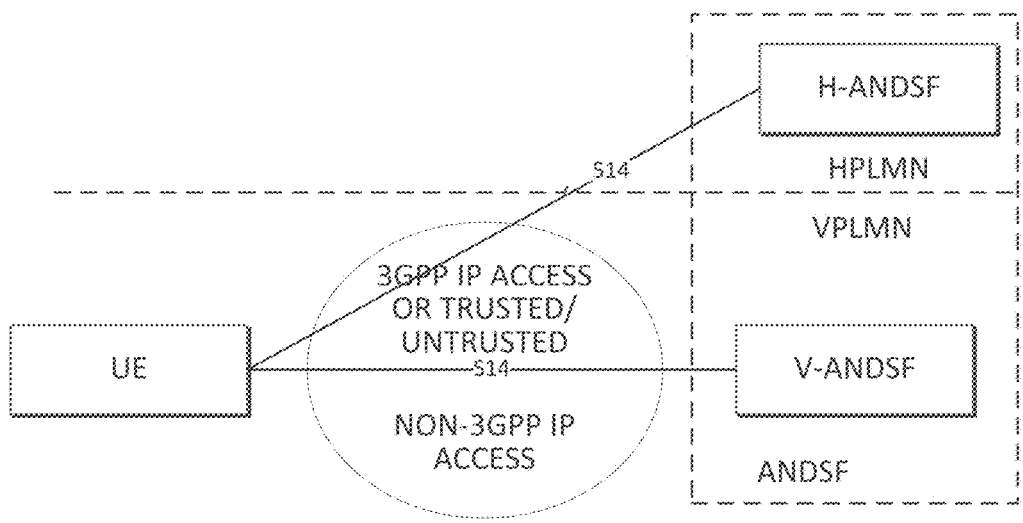
FIG. 3 is an illustration of the roaming architecture for ANDSF
Figure 4:
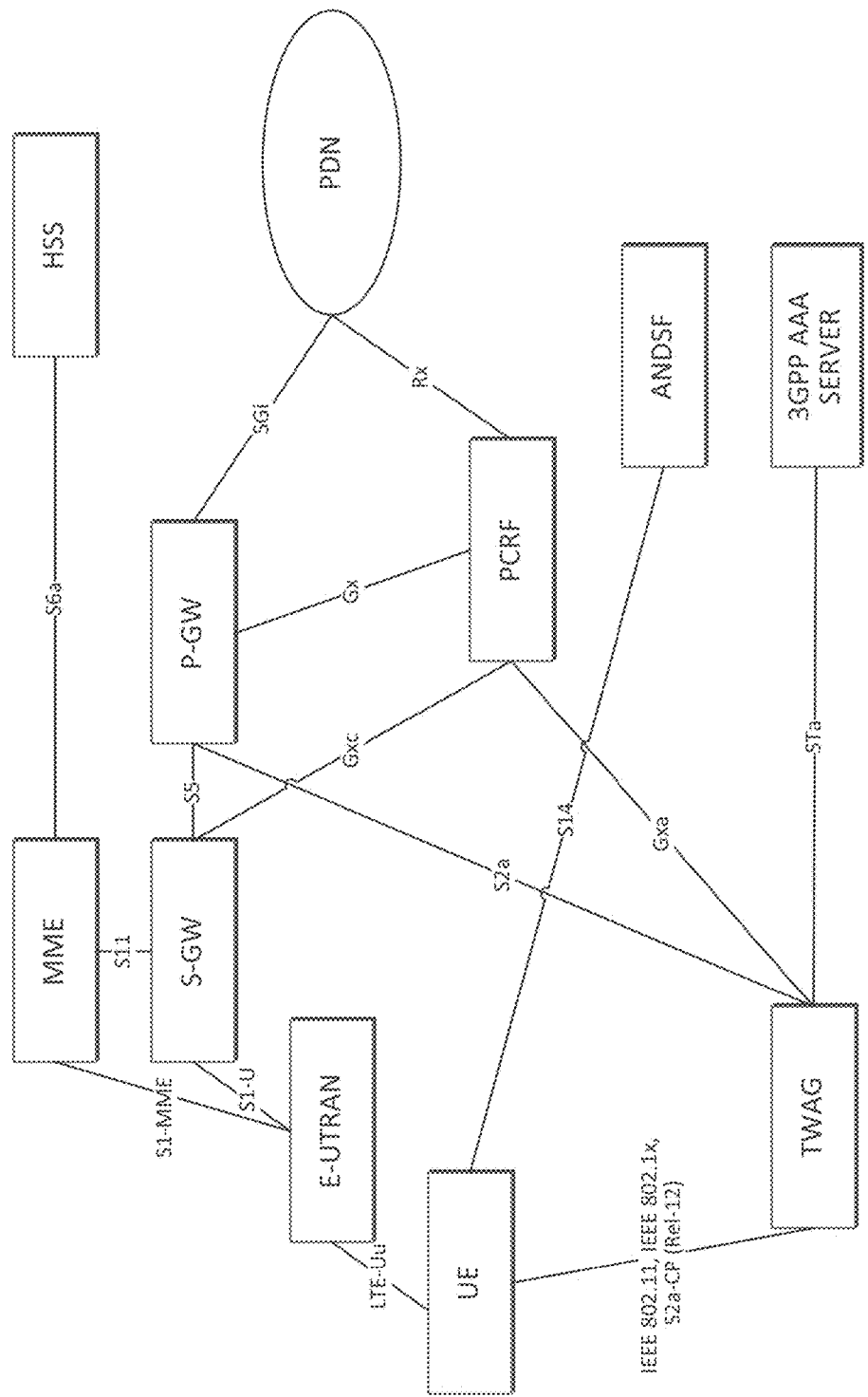
FIG. 4 is an illustration of mobile network architecture and interfaces for LTE/EPC and WLAN.

AP Access Point in WLAN
ANDSF Access Network Discovery and Selection Function
CN Core Network
BSC Base Station Controller
DHCP Dynamic Host Configuration Protocol
DNS Domain Name System
E-UTRAN Evolved Universal Terrestrial Radio Access Network
H-ANDSF Home-ANDSF
HPLMN Home PLMN
HSS Home Subscriber Server
GW GateWay
IMEI International Mobile Equipment Identity
IMSI International Mobile Subscriber Identity
ISMP Inter-System Mobility Policies
ISRP Inter-System Routing Policies
MME Mobility Management Entity
QoS Quality of Service
P-GW PDN Gateway
PCRF Policy and Charging Rules Function
PCC Policy and Charging Control
PDN Public Data Network
PLMN Public Land Mobile Network
RAN Radio Access Network
RAT Radio Access Technology
RNC Radio Network Controller
S-GW Serving-GW
STA Station
TWAG Trusted WLAN Access Gateway
UE User Equipment

DETAILED DESCRIPTION

Throughout the drawings, the same reference designations are used for similar or corresponding elements.

As used herein, the non-limiting terms "User Equipment", "terminal", and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPad, customer premises equipment, CPE, laptop embedded equipment, LEE, laptop mounted equipment, LME, USB dongle, a portable electronic radio communication device, a sensor device equipped with radio communication capabilities or the like. In particular, the term "UE", the term "terminal", and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

In addition, in this text the term UE will be used for a terminal that has the capacity to connect to WLAN and to cellular RAT of different types, despite the fact that the standardized term for the terminal is Station (STA) in WLAN, mobile station or some other name in other RATs than UTRA, WCDMA and LTE. UE is short for User Equipment in some standards as the LTE. Here is meant the terminal including its subscription identity such as a SIM-card. The UE need not be used by a human being while also may be included in a machine of some type. The UE may also be stationary.

As used herein, the non-limiting term "radio network node" may refer to base stations, network control nodes such as network controllers, radio network controllers, RNC, base station controllers, BSC, and the like. In particular, the term "base station" may encompass different types of radio base stations including standardized base stations such as Node Bs, or E-UTRAN NodeBs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

In the current disclosure the phrase RAN/RAT selection will, for simplicity reasons, be used to entail both radio access network selection as well as traffic steering.

In order to provide a more thorough understanding of the benefits of the proposed technology, a brief overview of current radio access network selection and traffic steering processes will be described below.

Cellular Radio Access Networks, RAN:s, comprise an infrastructure for providing mobile radio access and connect the UEs to a core network, for example the SAE, System Architecture Evolution network. The RAN applies a Radio Access Technology, RAT. A RAN may be assigned to one PLMN (Public Land Mobile Network) or may be shared by a plurality of PLMNs. In this description the term RAN shall be construed as the infrastructure while also including PLMNs.

To meet the increasing demands for capacity the networks providing service to the PLMN user, are becoming more heterogeneous, in terms of cell sizes, Radio access technologies, RAT, usage of frequency spectrum etc., these types of networks are commonly referred to as heterogeneous networks.

3GPP standardize cellular types of Radio Access Technologies, RAT, for Radio Access Networks. WLAN is a non-cellular RAT that is standardized by IEEE with some extensions specified in Wi-Fi Alliance (WFA). The cellular types of RAT/RAN include sophisticated means for User Equipment, UE, mobility and RAN control of the UE mobility. 3GPP TSG RAN studies in 3GPP Rel-12 the introduction of RAN based mobility between the 3GPP 3G and 4G RATs and WLAN. A purpose is that the service as provided to a specific UE via the core network shall be maintained between the different RAT/RAN. The Access Network Discovery and Selection Function (ANDSF) is a 3GPP defined function, since 3GPP Rel-8 and it is continuing to evolve, and provides the possibility to send different policies to the UE for access/network discovery and selection, and traffic routing/steering. ANDSF is thereby a specified method to supply information that can be used by the UE for mobility or connectivity between 3GPP RAT and WLAN. ANDSF is under further development and its capabilities needs to be considered within the context of the aforementioned study of the RAN based mobility conducted by the 3GPP TSG RAN. It is fair to assume that the future standards will support a coexistence of both approaches and thus the final solution will converge towards a hybrid approach where ANDSF and RAN based mobility control will be used in a coordinated/synergetic manner.

The cellular RATs are typically standardized by 3GPP, such as GSM, GPRS, UTRA, WCDMA, EDGE, HSPA, LTE while also non 3GPP cellular RATs such as CDMA 2000 can be one of the cellular RAT that the present embodiments applies to. The RANs of these types of RAT control the mobility or connectivity of a connected or idle UE. This control is based on measurements performed by the UE, and many other parameters such as subscription, roaming, service on-going, network load etc., the RAN/RAT and cell/s. If the network control determines that another cell than the cell currently serving the UE is better for the UE and the network, a handover is initiated by the source RAN. The word 'handover' includes moving selected data flows (called bearers in 3GPP) between 3GPP and WLAN, i.e. the UE may keep connections to both 3GPP and WLAN. The RAN may also comprise means for directing the UE to reconnect to the network in case the communication is temporarily lost. An idle mode UE autonomously selects a 3GPP cell to camp on based on information received from the RAN. At initial attach in a network, the UE reports of its presence in the network and its location within a cluster of cells, such is named Tracking Areas, Location Areas, Routing Areas depending on the type of RAN/RAT, becomes known to the core network. If the UE roams to a cell outside the cluster where its presence is known by the network, the UE signals its presence via the new cell. The network can direct an incoming UE terminating session to the UE by the knowledge of the UE presence in the cluster of cells, i.e. by paging the UE in the relevant cluster of cells. When the UE transits from Idle mode to connected mode, e.g. as a result of paging, the RAN will keep track of the UE location with cell (or URA=UTRAN Registration Area) granularity.

WLAN (Wireless Local Area Network) is standardized by IEEE, and is an example of a non-cellular RAN/RAT. Wi-Fi is a brand name of one of these WLAN products. WLAN can link two or more Access Points, AP, and that forms a RAN that allows a UE to be connected via any of its AP. The current WLAN standard does not provide the RAN with means for knowing the location or presence of the UE within the RAN until a connection is set up on the initiative of the UE. The WLAN standard provides quite limited means for controlling the UE mobility when a connection has been established, albeit such solutions have been proposed and are being discussed. Accordingly there is no correspondence in WLAN to the cellular RAN UE status attached idle. An UE that is connected is defined to be e.g. "RRC connected" to the cellular RAN/RAT as standardized by the 3GPP. When speaking of an UE being "RRC connected" in WLAN this shall be seen as a free interpretation as there is not necessarily any protocol called RRC on the WLAN side. It is however the term used in the current application to indicate that the STA is associated and/or connected to the WLAN AP. In the same way, it is described that WLAN side uses RRC control messages and this is to be seen as to mean any control or user plane protocol as defined in the IEEE WLAN specifications towards the STA.

As the operators of PLMN foresee that the load in the RAN will continue to grow, WLAN and other non-cellular RAT have become attractive options for providing the PLMN users with access to the Core Network and it services. The ANDSF server is a Core Network function and as such it is introduced in the Core Network, for the purpose of bridging some of the differences in the mobility functioning on the WLAN as compared to the cellular network such that a UE can be mobile not only between the cellular networks of different types of RATs while also into the non-cellular RAT/RAN. The ANDSF is specified for example in 3GPP TS 24.312, and it is structured into a number of rules that are commonly referred to as trees as they include number of alternatives in a hierarchy of levels. The first of these levels are the conditions, and that are commonly referred to as the branches in the tree and at the finest granularity there are the leaves. As a generic term for the ANDSF rule, condition and leaf will here be used the term ANDSF settings. When in this description it is stated that the ANDSF settings are overridden by the UE this may be the complete branch, a condition or just one or more of the leaves, that is/are being overridden. The ANDSF settings overridden are optionally replaced by other settings.

Below follows of a brief summary of the proposed technology and advantages thereof.

An object of teachings disclosed in the description is to enable flexible adaptation of the radio access network selection and traffic steering for a UE in a heterogeneous network scenario were cellular RAN/RAT as well as non-cellular RAN/RAT may be selected.

An aspect of the teachings relate to a UE for a Heterogeneous network scenario network and comprised with a radio interface for connecting to Radio Access Networks, RAN, of different Radio Access Technologies, RATs, comprising the types of:

Cellular RAT
Non cellular RAT

The UE also comprises an interface for communicating, via the radio interface, with an ANDSF server for receiving ANDSF settings. The UE is adapted for discovery and radio access network selection and traffic steering according to the ANDSF settings. The UE is further adapted to override at least some of the ANDSF settings for RAN/RAT selection at a predefined event, and then apply other policy for the selection of RAN/RAT than that of the ANDSF settings.

In one embodiment the predefined event is any of:
The UE becomes connected to one of said RAN/RATs
A specific type of service, for example a voice connection, or VoIP, is being set up in one of said RAN/RATs.

In another embodiment the predefined event is the reception of control message in one of said RAN/RATs and that the UE is attached or connected to. The control message, that has the effect of at least some of the ANDSF settings shall be overridden, is received according to any of the alternatives;

Dedicated signalling. In one embodiment the control message is received in the form of a RRC message that is a modification of currently available RRC messages, or may alternatively be a new type of RRC message.

Broadcast. In one embodiment the System Information (SIBs, Cell Broadcast, etc.) includes new information elements that carry the control message.

The embodiment may optionally be combined with a further condition for overriding the ANDSF settings:

A specific type of service, for example a voice connection, or VoIP, is being set up in one of said cellular type of RAT The embodiments may be combined with any of the further options of:

The override of the parameters received by means of ANDSF can be temporary, i.e. a timer value is provided to the UE(s) indicating the validity period of the override.

The parameters that are overridden shall be either set to new values provided in the dedicated or broadcast signalling means or reset to some pre-defined values if no new values are provided.

The parameters can be indicated being valid for a subset of WLAN APs, cells and or per PLMN of the registered UE or even for the PLMN of the potential target WLAN APs.

Other aspects of these teachings relate to a RBS/AP adapted for sending control messages to UE, to the effect of that the UE shall override its ANDSF settings.

Below follows a more detailed description of the various aspects of the proposed technology.

As stated previously, the inventors have come to the realization that a more efficient RAN based control of radio access technology selection and traffic steering in heterogeneous networks is necessary in order to more efficiently utilize ANDSF policies and/or RAN policies for user equipment in such systems. In particular, the inventors have identified the need for a more adaptive utilization of the different policies by enabling suspension/activation of provided ANDSF policies for associated user equipment. The determination of which policies should be used by a user equipment can be controlled by the user equipment itself, or by the radio access network or the ANDSF policy server node, the details of which will be described below.

Figure 5:
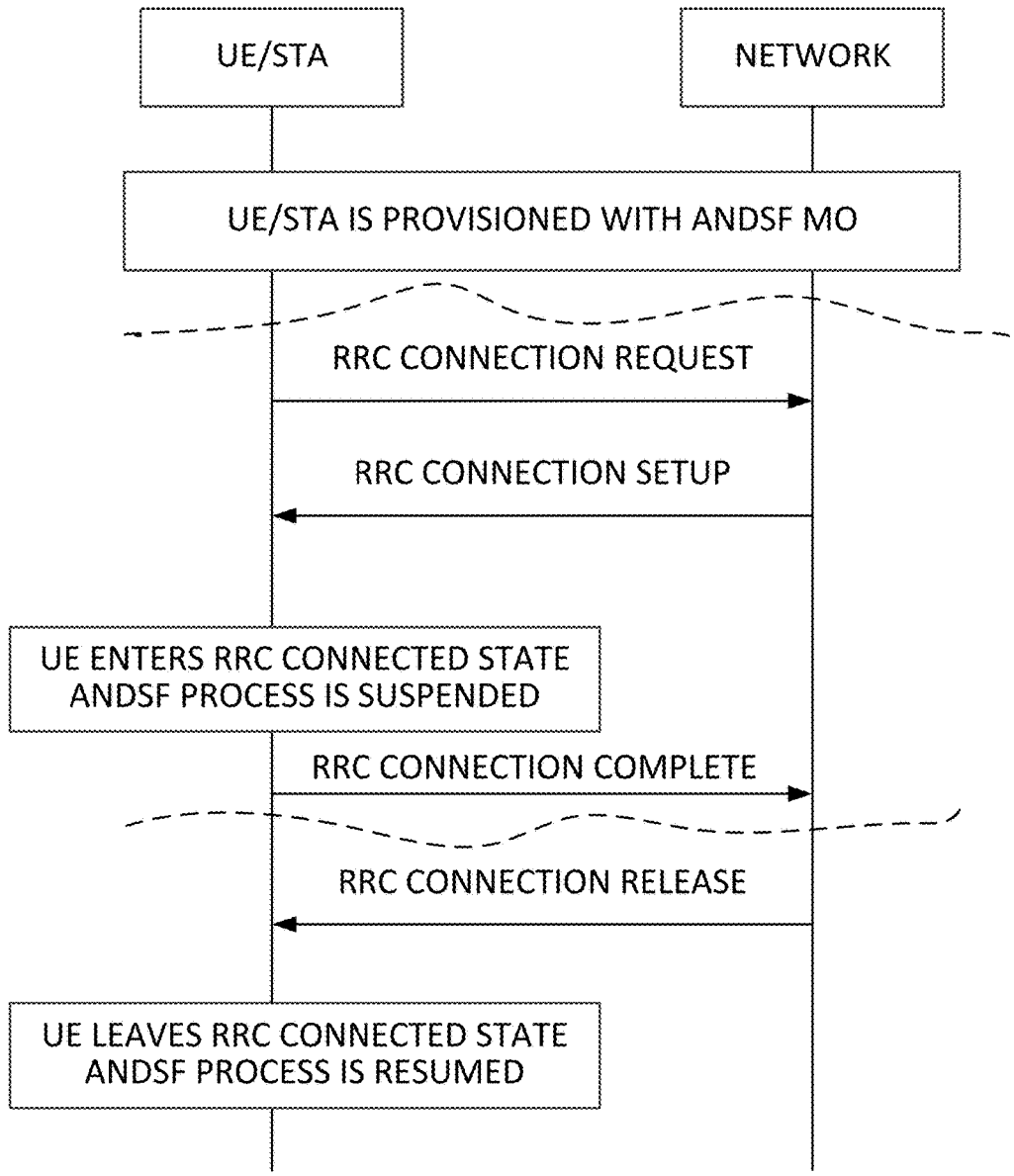
FIG. 5 is a signaling chart of an embodiment of the presented technology.

With reference to FIG. 5, a signalling diagram of an embodiment of the proposed technology will be described, in which the user equipment is in control of when a suspension or activation of provided ANDSF polices should occur.

In a first embodiment the UE is configured to autonomously override of the ANDSF setting upon entering specific radio states, e.g. RRC Connected in 3GPP or Associated in WLAN. The autonomous override can be applied to all 'cells' or only when connected to a specific subset, where the subset is provided with (enhanced) ANDSF MO (Managed Object, as described in 24.312).

In this embodiment the UE may be configured with a predefined rule or setting for when the ANDSF settings shall be overridden in whole or in part. It does not require any signaling of explicit control messages for the ANDSF settings to be overridden. The FIG. 5 shows an example, using message names from 3GPP UTRAN and E-UTRAN. For other RAT, corresponding messages can be envisioned.

Figure 6:
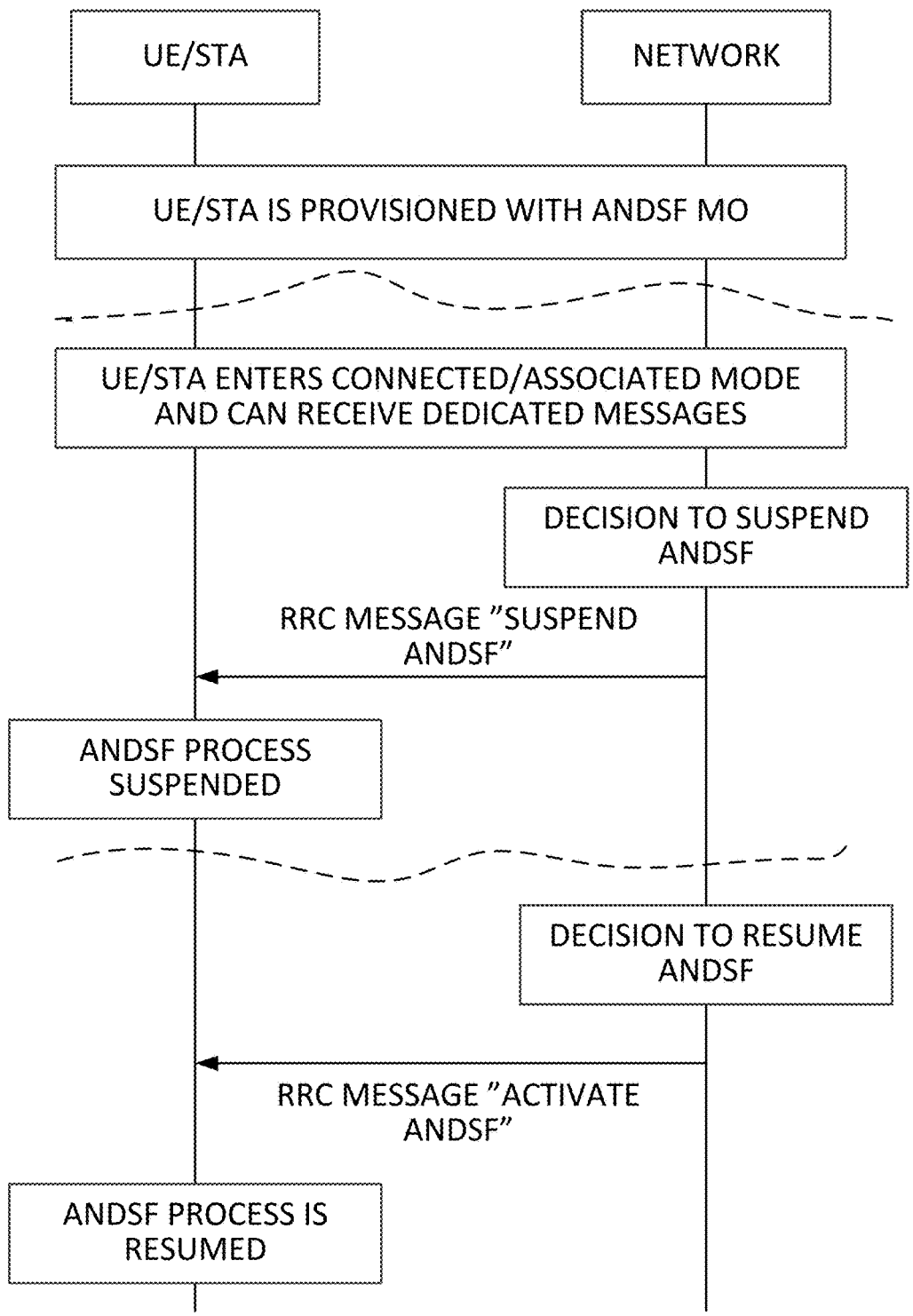
FIG. 6 is a signaling chart of a further embodiment of the present technology.

With reference to FIG. 6 a signaling diagram of another embodiment of the proposed technology will be described. In this case, the UE is not provisioned with a predefined set of rules for autonomously overriding the ANDSF settings, but rather the UE is configured to suspend ANDSF settings upon reception of dedicated signaling e.g. RRC message or similar from a network node.

In this embodiment control messages are sent from the network to the UE to override ANDSF settings in the UE. The control message may be in the form of a modification of existing RRC messages which information element/s has/have been modified or into which new information elements has been introduced. Alternatively the control message is in the form of a new RRC messages. The control message is sent from the RAN to the UE by means of dedicated signaling.

The control message is alternatively broadcast and may then be conveyed in the form of new information elements introduced in the System Information on the broadcast channels.

The above described embodiment involves both the UE and the network, as represented by a radio base station, RBS, or a WLAN AP, since a control message is signaled from the RBS/AP to the UE.

According to a first option, the second embodiment introduces means to override (suspend) ANDSF settings in the UE(s) by means of modification of existing or adding new RRC messages and information elements that can be sent from the RAN to the UE by means of dedicated signaling.

Figure 7:
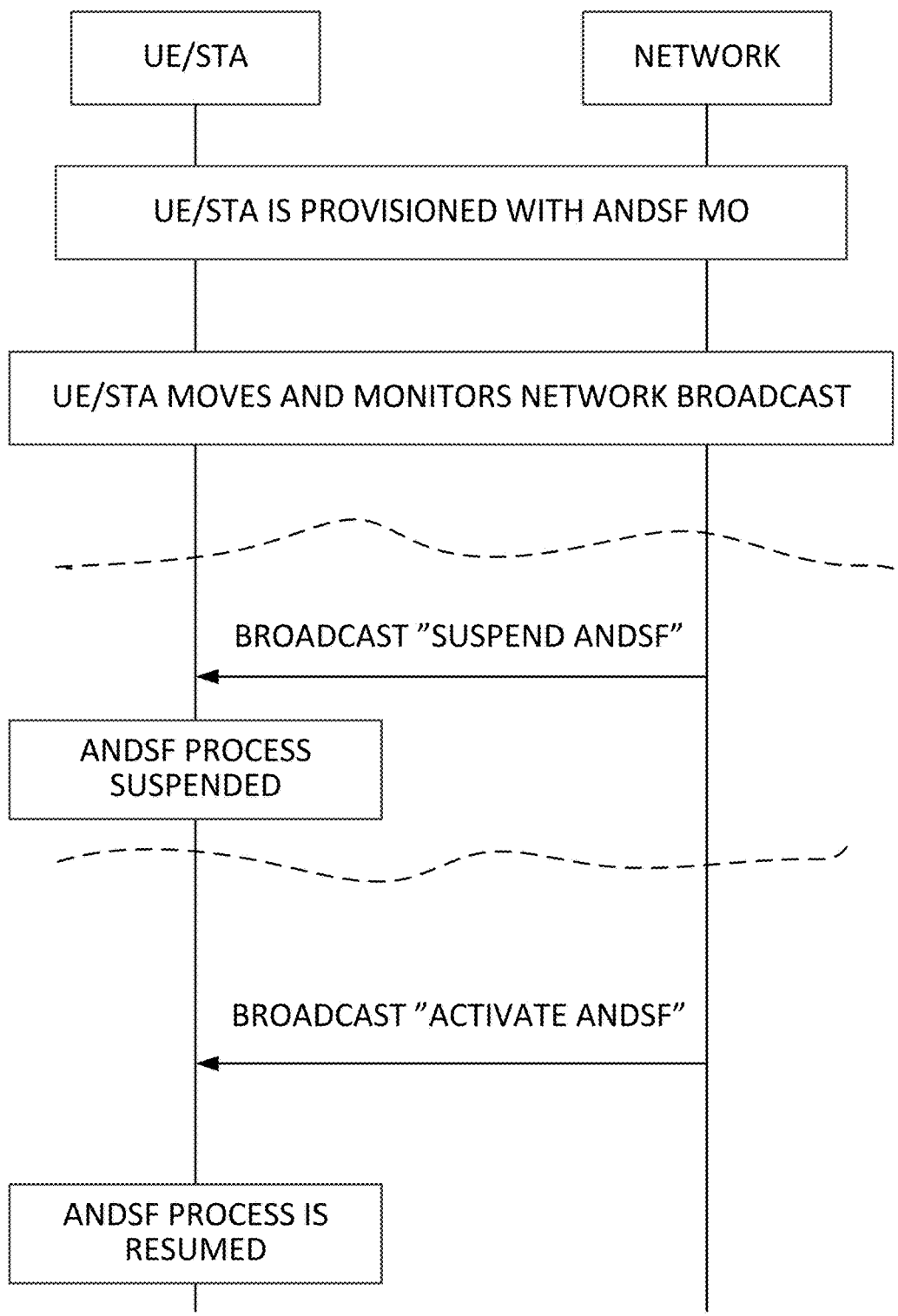
FIG. 7 is a signaling chart of an additional embodiment of the present technology.

The second embodiment, whether it is according to the option of dedicated signaling or according to the optional broadcast, as illustrated in FIG. 7, may be useful e.g. when the UE enters an area with no IP continuity between 3GPP and WLAN domains, when the UE enters an area where the load situation is such that the UE should not move from the current technology or when some specific service has been started such that ISMP, i.e. the Inter-System Mobility Policies, should not apply. As described in the background section, ISMP policies may recommend that a service should be served by 3GPP. This may be correct for most network scenarios, albeit, if a service is started when the UE is located in an area with only WLAN coverage using e.g. a co-operating network, it should not attempt to connect to a cellular network since the co-operating networks in this situation does not support IP continuity.

An alternative option of the this embodiment introduce means to override ANDSF setting by new information elements introduced in the System Information on the broadcast channels, as illustrated in FIG. 7. Broadcast channels are not to be read as limited to System Broadcast or Beacon, but includes also e.g. Cell Broadcast channels and similar network-initiated signaling to all or a group of UE/STAs. In contrast to the dedicated signaling which is received by a "RRC connected" UE, the broadcast signaling is reached also by idle mode UEs. The override of ANDSF settings may apply to idle mode, and/or connected mode despite whether it is signaled by broadcast, dedicated signaling or it is event triggered.

For both the above described embodiments, it is the network that determines when a user equipment should suspend or activate ANDSF settings. This can be based on e.g. core network information provided to the RAN.

Figure 8:
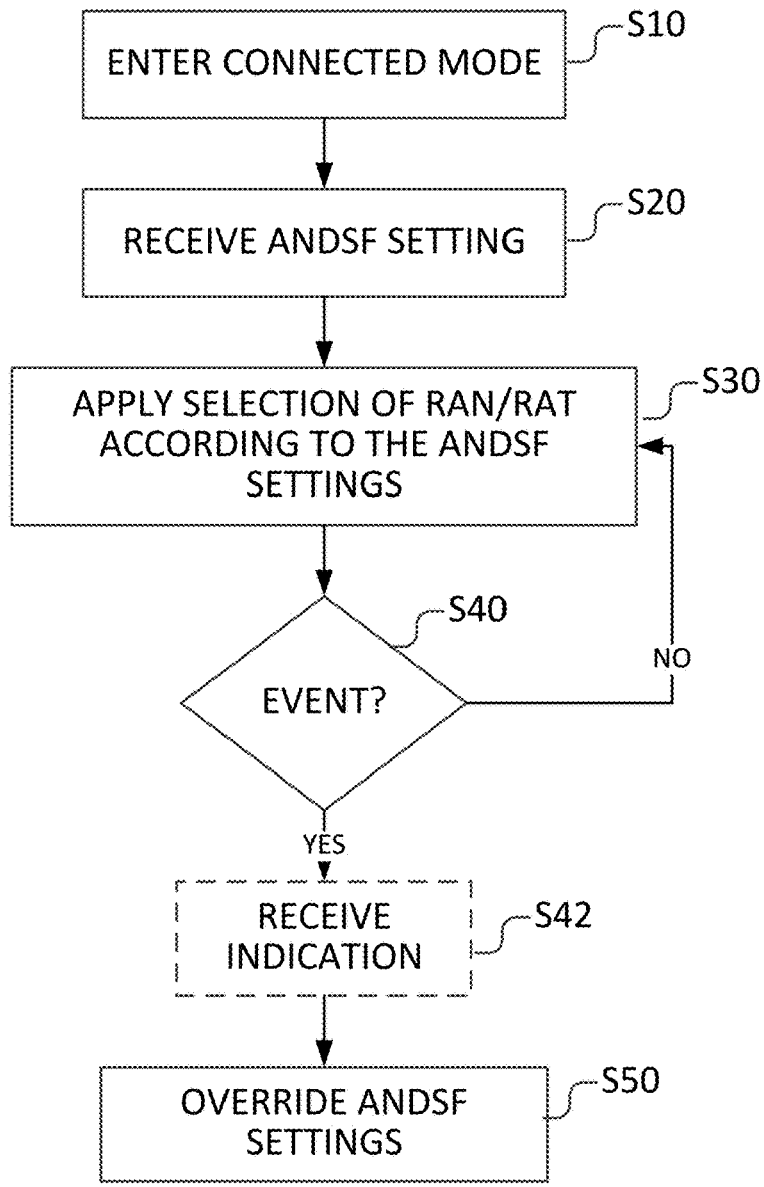
FIG. 8 is a flow chart of an embodiment of a method in a user equipment of the present technology

With reference to FIG. 8, an embodiment of a method in a user equipment 100 for controlling radio access network selection and traffic steering for the user equipment in a heterogeneous communication network will be described. The method will be described as performed by the user equipment 100, and the communication network includes at least the user equipment 100, at least one network node such as a radio access network controller node 200 or radio base station node and at least one ANDSF policy server node 300 with which the user equipment 100 is associated. Accordingly, the method includes the user equipment 100 adaptively at least partly suspending or activating provided ANDSF policies to enable switching between radio access network control or ANDSF policy control of radio access network selection and traffic steering for the user equipment. In this context the use of at least partly suspending should be understood as concerning a case where radio access network selection e.g. RAN/RAT selection is controlled by RAN and traffic steering is controlled by the ANDSF settings or vice versa, in other words only ANDSF settings concerning RAN/RAT selection are suspended or overridden This will be described further below.

According to a particular embodiment, the user equipment 100 enters, in step S10, a connected mode, by either entering a connected mode (or similar) to 3GPP or to Wi-Fi in a heterogeneous communication network. Connected can also include a simultaneous connection to multiple RAN/RATs. Subsequently, the user equipment 100 receives, in step S20, ANDSF settings e.g. ANDSF policies from the ANDSF policy server and applies, in step S30, a selection of radio access network and traffic steering based on the received ANDSF settings. Upon detecting, in step S40, a predefined event the user equipment 100 suspends, in step S50, at least part of the applied ANDSF settings based on the detected predefined event.

As used herein the term connected can refer to an "RRC connected" mode in 3GPP or it can refer to a similar mode in a different RAT, such as Associated in WLAN. It is to be understood as describing a mode in which the user equipment is associated with or in communication using a radio access technology of any kind.

According to a particular embodiment, when being in the RRC-connected mode (or similar), in step S10, the UE receives, in step S20, the ANDSF settings. The UE may be "RRC connected" to a WLAN or to a cellular RAN/RAT when the ANDSF settings are received. The UE applies, in step S30, the ANDSF settings and the RAT/RAN is selected accordingly, and that may involve change/s of RAN/RAT. The UE may also shift mode from connected to idle, and back again, several times. At some occasion an event occurs, in step S40, and that may be a predefined event such as the UE becomes RRC connected to a specific RAN/RAT, or may be involved in a specified service optionally with the further condition of this being in a specified RAN/RAT or in specific cells or APs, as is the first embodiment. The event may also be the reception of a control message, according to the second embodiment.

Figure 9:
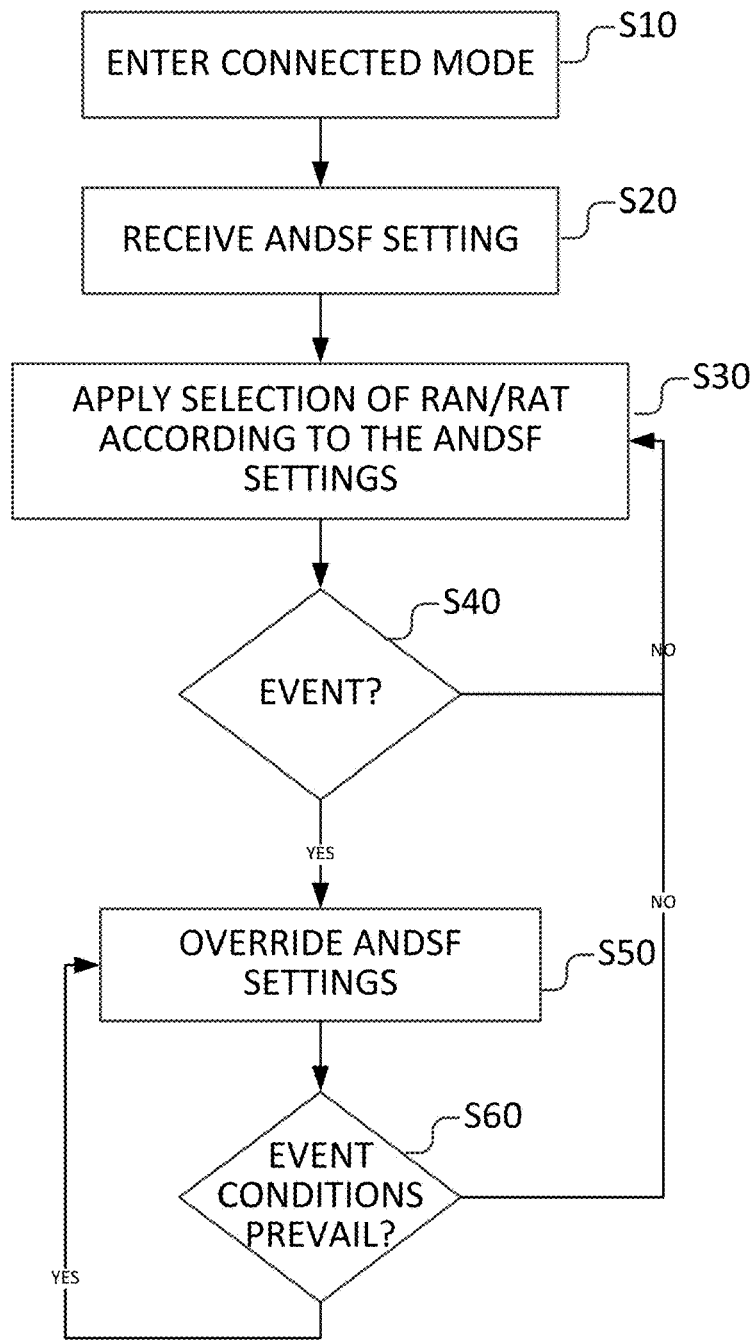
FIG. 9 is a flow chart of another embodiment of a method according to the present technology.

The UE optionally controls that the event conditions still applies, in step S60, and if not it applies the ANDSF settings, in step S30, for the selection of RAN/RAT. This is depicted in the FIG. 9. In other words, the user equipment monitors, in step S60, the predefined event, and controls, in step S50, suspending or activating ANDSF settings based on the monitoring.

Figure 10:
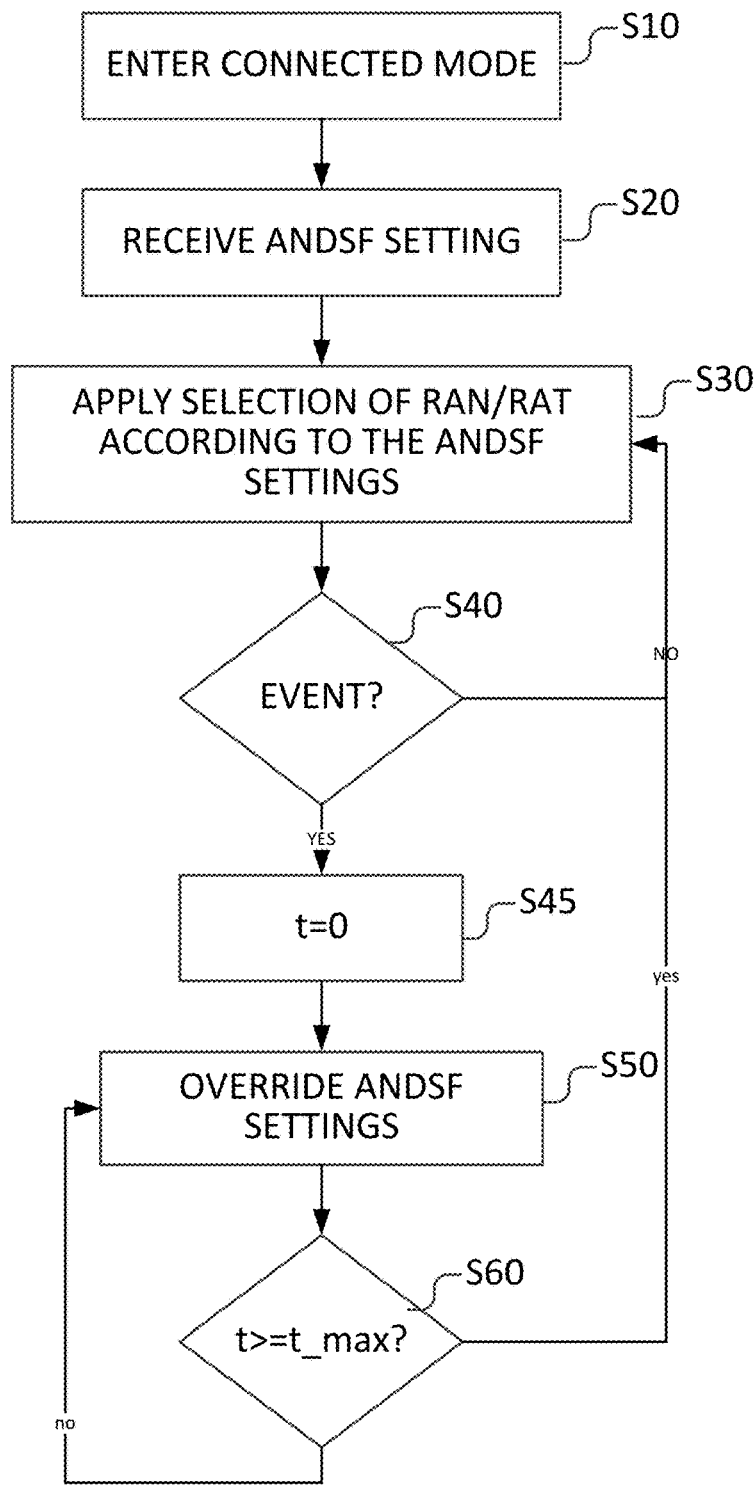
FIG. 10 is a flow chart of a further embodiment of a method according to the present technology.

According to a further embodiment, the predetermined event may optionally be valid for a defined set of time t_max, and the UE then controls the timing in the optional step S60, and overrides the ANDSF settings until the timer expires, see FIG. 10. In particular the user equipment sets a timer, in step S45, in response to detecting the predefined event, and monitors, in step S60, the set timer and activates previously suspended ANDSF settings when the timer reaches a predetermined value.

The aforementioned predefined event can, according to further embodiments, include that the user equipment enters a predetermined mode such as a RRC connected mode in 3GPP or Associated in WLAN or similar.

As mentioned previously, the suspension or activation of ANDSF settings in the user equipment can be triggered by the user equipment 100 itself (as described above), or triggered by the radio access network or by the ANDSF policy server node.

According to a particular embodiment, the predefined event comprises the user equipment 100 receiving a dedicated message from the radio access network e.g. radio base station or radio access network controller node 200 causing suspension or activation of the ANDSF settings. According to a further embodiment the predefined event comprises the user equipment 100 receiving a broadcast message from the radio network controller node 200 on a monitored broadcast channel, causing suspension or activation of said ANDSF settings.

Figure 11:
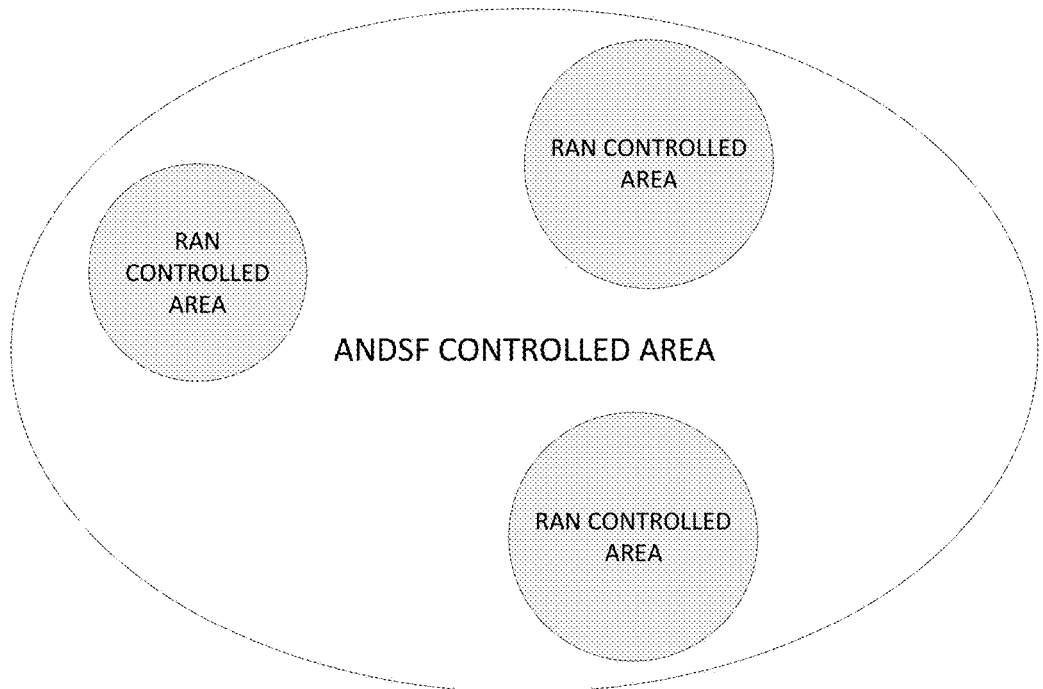
FIG. 11 is a schematic illustration of a system in which the present technology can be implemented.

FIG. 11 shows as an example a simplified target network applying embodiments of the teachings. In this embodiment, the ANDSF and RAN respectively control different geographical locations in the network. The network thereby consists of different areas that are either controlled by RAN mechanisms or that are controlled by ANDSF.

In this embodiment, the predefined event is represented by the UE being connected in a PLMNs, Tracking Areas, Location Areas, Routing Areas, or cell/s and that has been indicated by the ANDSF server as logical entities were the ANDSF settings does not apply. When being in "RRC connected" or idle states in such logical entity the mobility of the UE is in the control of the RAN/RAT.

The target network in FIG. 11 means that different mechanism are needed to indicate to the UEs which control, RAN or ANDSF, is to be applied in a specific location. One embodiment by which this is achieved is to broadcast a control message as part of the 3GPP System information and that instructs: "RAN takes access selection decisions towards non-3GPP Accesses in this area, ANDSF shall not be used". That is the simplest level of indication, and it can also be provided as part of dedicated signaling if there is need to steer this on per MS/UE level. Another embodiment includes the ANDSF server node providing the location information to the user equipment, either as part of the original ANDSF settings, or as a separately provided indication.

Thereby, according to yet another embodiment with reference to FIG. 8, the predefined event comprises the user equipment 100 entering a predetermined geographical area or cell, and the user equipment 100 retrieves, in optional step S42, an indication from the ANDSF server node 300, which indication provides information relating to if the radio access network selection and traffic steering for the user equipment 100 is controlled by the radio access network node or by the provided ANDSF settings for the predetermined geographical area, and the user equipment 100 is then configured to suspend or activate received ANDSF settings in the predetermined geographical area based on the indication. As mentioned previously, the suspension of the ANDSF setting can be complete or only partial, e.g. by suspending the ANDSF settings for access selection but maintaining the ANDSF settings active for traffic steering.

The user equipment may also include radio circuitry for communication with one or more other nodes, including transmitting and/or receiving information.

Within 3GPP, the UE obeys broadcast from only one cell at each time. Hence there is no potential conflict within the 3GPP domain. If the broadcast is sent across both 3GPP and WLAN, then there could be conflicts between the received indications in border areas. Such conflicts are resolved by e.g. (a) a rule that 'activate' (or 'suspend') has precedence when received from one 'side' or (b) that one side has precedence (based on signaling or rule).

Further embodiments include that the RAN would control any access selection and traffic steering towards the Operator Controlled WLAN. In this case the RAN or the ANDSF can indicate also the specific BSSID, i.e. the MAC address of a specific AP ESSID, i.e. the common identity of two or more interconnected APs, and/or SSIDs, i.e. the identity of a group of APs that form a small WLAN, that shall be controlled by RAN.

The override of the parameters received by means of ANDSF can be temporary, i.e. a timer value is provided to the UE(s) indicating the validity period of the override.

The parameters that are overridden shall be either set to new values provided in the dedicate or broadcast signaling means or reset to some pre-defined values if no new values are provided.

The parameters can be indicated being valid for a subset of WLAN APs and or per PLMN of the registered UE or even for the PLMN of the potential target WLAN APs.

In this embodiment, the ANDSF server itself indicates to the UE the different RAT areas (PLMNs, Tracking Areas, Location Areas, Routing Areas and/or cells) in which the RAN mechanism take preference and ANDSF shall not be used. These areas can also been seen as logical entities. The UE overrides the ANDSF settings when entering any of these logical entities. The override can also apply to selected parts of the ANDSF MO (see 24.312 and later additions), e.g. the ISRP branch.

Figure 12:
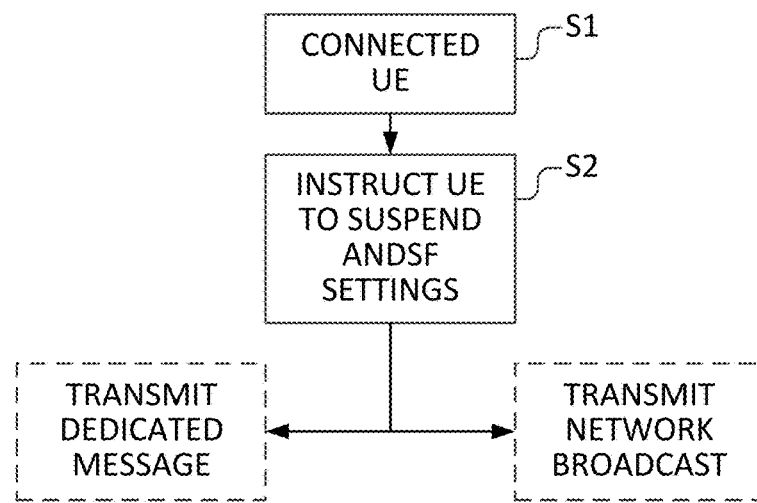
FIG. 12 is a flow chart of an embodiment of a method in a network node of the present technology.

With reference to FIG. 12, an embodiment of a method performed by a network node 200 e.g. radio base station or radio access network controller 200 will be described. The method enables controlling radio access network selection and traffic steering for a user equipment 100 served by the radio access network controller node 200 in a heterogeneous communication network, and includes providing instructions, in step S2, to a connected or idle user equipment 100 enabling the connected or idle user equipment 100 to at least partly suspend any active ANDSF settings, or to at least partly activate previously suspended ANDSF settings in response thereto. Initially, in optional step S1, the network node detects a connected user equipment 100 and subsequently provides instructions or indications to the user equipment concerning which entity or rules that controls the radio access network selection and/or traffic steering, or in the case of a served but idle user equipment 100 the network node 200 is configured to send a specific instruction to the idle served user equipment 100 concerning which entity or rules that controls the RAN/RAT selection and/or traffic steering. According to one embodiment, the network node 200 transmits a dedicated message to the user equipment instructing the user equipment which rules to use. In another embodiment, the network node 200 broadcasts a general message to all user equipment 100 within its cell providing information as to which rules should be used in that particular cell.

Figure 13:
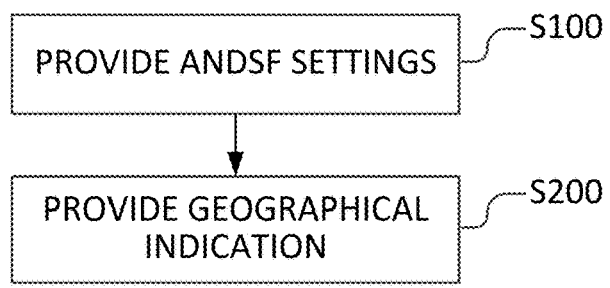
FIG. 13 is a flow chart of an embodiment of a method in an ANDSF policy server node of the present technology.

With reference to FIG. 13, an embodiment of a method performed by an ANDSF policy server node 300 for enabling controlling radio access network selection and traffic steering for a user equipment 100 being served by a network node such as a radio access network controller 200 in a heterogeneous communication network, the user equipment 100 is associated with the ANDSF policy server node 300. AS mentioned in the previous description, the ANDSF policy server node 300 is configured to provide ANDSF policies or settings, in step S100, to the user equipment 100. Further, according to a particular embodiment the ANDSF policy server node 300 is then configured to perform the steps of providing an indication, in step S200, to the user equipment 100 about selected geographical areas in which radio access network selection and traffic steering for the user equipment 100 is controlled by provided ANDSF settings or by the radio access network, which indication enables the user equipment 100 to adaptively suspend or activate ANDSF settings upon entering the selected geographical areas.

Figure 14:
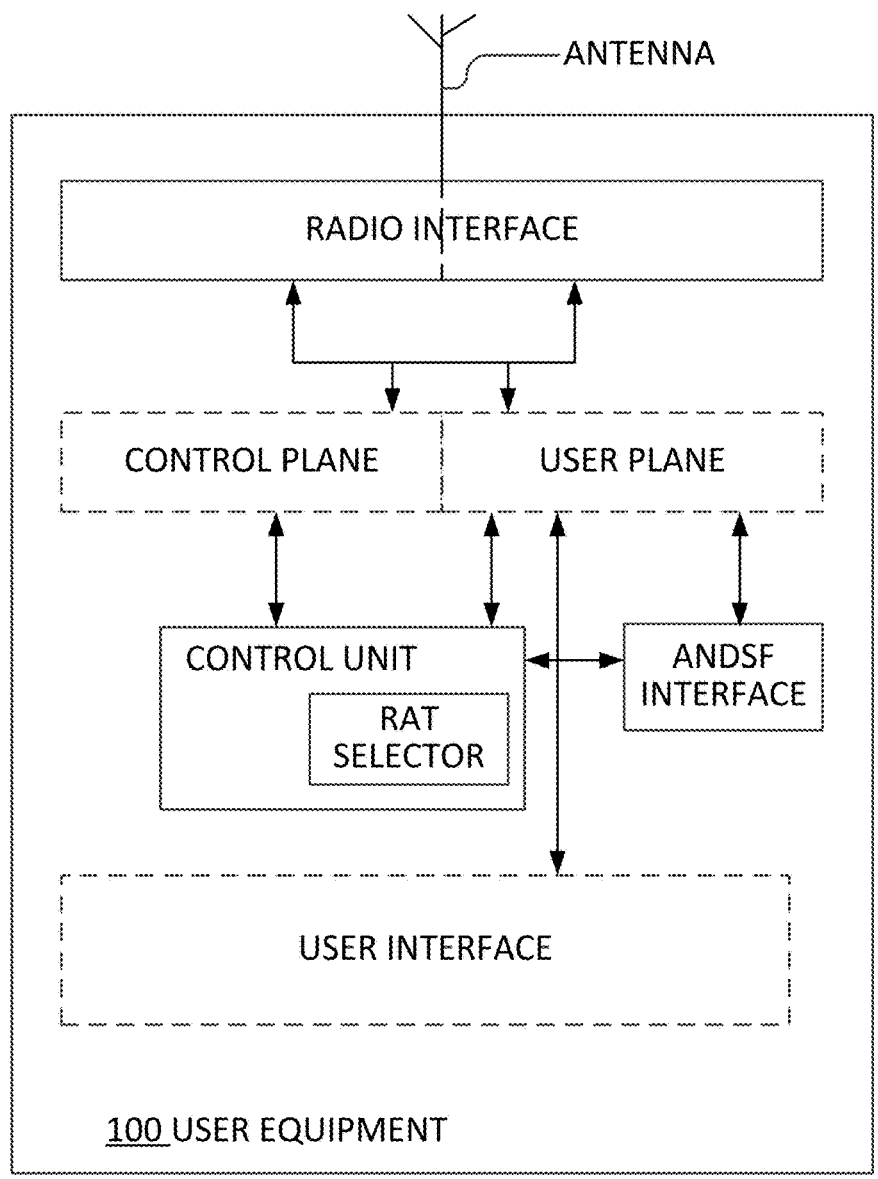
FIG. 14 is a block diagram of an embodiment of a user equipment according to the present technology.

With reference to FIG. 14, embodiments of a user equipment 100 according to the proposed technology will be described. The user equipment 100 is served by a network node 200, such as a radio base station or radio network controller node, and is associated with an ANDSF policy server node 300. The user equipment 100 is configured to communicate in a heterogeneous network wherein the user equipment 100 is configured to adaptively at least partly suspend or activate provided ANDSF policies to enable switching between radio access network control or ANDSF policy control of radio access network selection and traffic steering for said user equipment 100.

In particular, the user equipment 100 is further configured to enter a connected mode, and receive ANDSF settings from said ANDSF policy server 300. Further, the user equipment 100 is configured to apply selection of radio access network and traffic steering based on the received ANDSF settings, detect a predefined event, and suspend at least part of the received ANDSF settings based on the detected predefined event. As mentioned previously, the connected mode may refer to an RRC connected mode in 3GPP or to an Associated mode in WLAN, or similar.

FIG. 14 is a simplified block chart of an embodiment of a UE 100, depicting only those parts of the UE 100 that are involved in the embodiments here disclosed. It comprises an antenna that connects to a radio interface, the radio interface is adapted for communication with plural types of RAT, including cellular RAT and a non-cellular RAT that is typically WLAN. The interface is typically constructed for supporting communication with a single switchable type of RAT. Alternatively the radio interface is adapted for supporting connections at two RAN/RAT in parallel. Keeping a WLAN connection in parallel to a connection to a cellular RAT/RAN is expected to be the more common enablement for keeping two parallel connections. The communication over the radio interface is logically separated into control plane and user plane and that is optionally handled by separate UE modules as is depicted in FIG. 14. The UE further comprises an ANDSF interface adapted for communication with the ANDSF server in the core network, and that is connected to the radio interface, in the figure via the user plane module. The reason is the ANDSF communication is tunneled from the ANDSF server to the UE transparently through the RAN/RAT.

The UE 100 also comprises a control module that is connected to the radio interface the control plane and user plane modules, and to the ANDSF server. The control module includes a RAT/RAN selection unit, as depicted in FIG. 14, or alternatively is connected to one (not depicted in FIG. 14). The RAT/RAN selection unit is feed with the ANDSF settings and is configured to select the RAT/RAN either by applying the ANDSF settings or by overriding these. In the first embodiment the RAT/RAN control unit is configured with information on events when the ANDSF settings shall be overridden. The RAN/RAT selection unit is also provided with information from the control unit on when specific events occur and that may trigger the overriding of ANDSF settings. The control unit further controls the operation of the radio interface. In the second embodiment the control unit may provide the RAT selector with a control message and the RAT selector is configured to override the ANDSF settings upon the reception.

The control unit may physically be distributed into several separate units and that are connected, typically one controlling the radio interface, other controlling the control and user planes. The control unit/s may be implemented in special purpose physical entities. It is expected though that it is implemented as some type of processor with a memory storing program code and when the code is run on the processor, the steps of selecting when the ANDSF settings shall be applied or not for the selection of RAN/RAT is executed. The method steps that such a processor is running through according the software is disclosed in FIGS. 8 to 10. A user interface may optionally be included in the UE 100.

Figure 15:
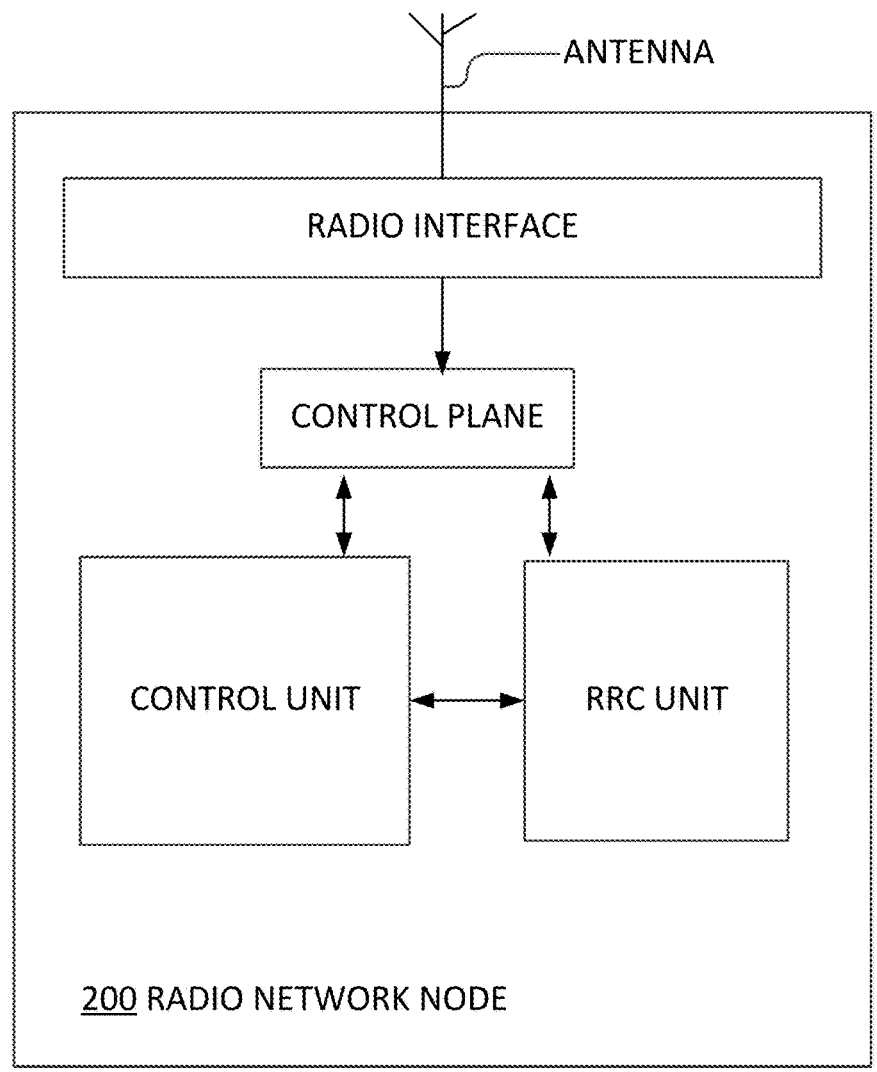
FIG. 15 is a block diagram of an embodiment of a network node according to the present technology.
Figure 16:
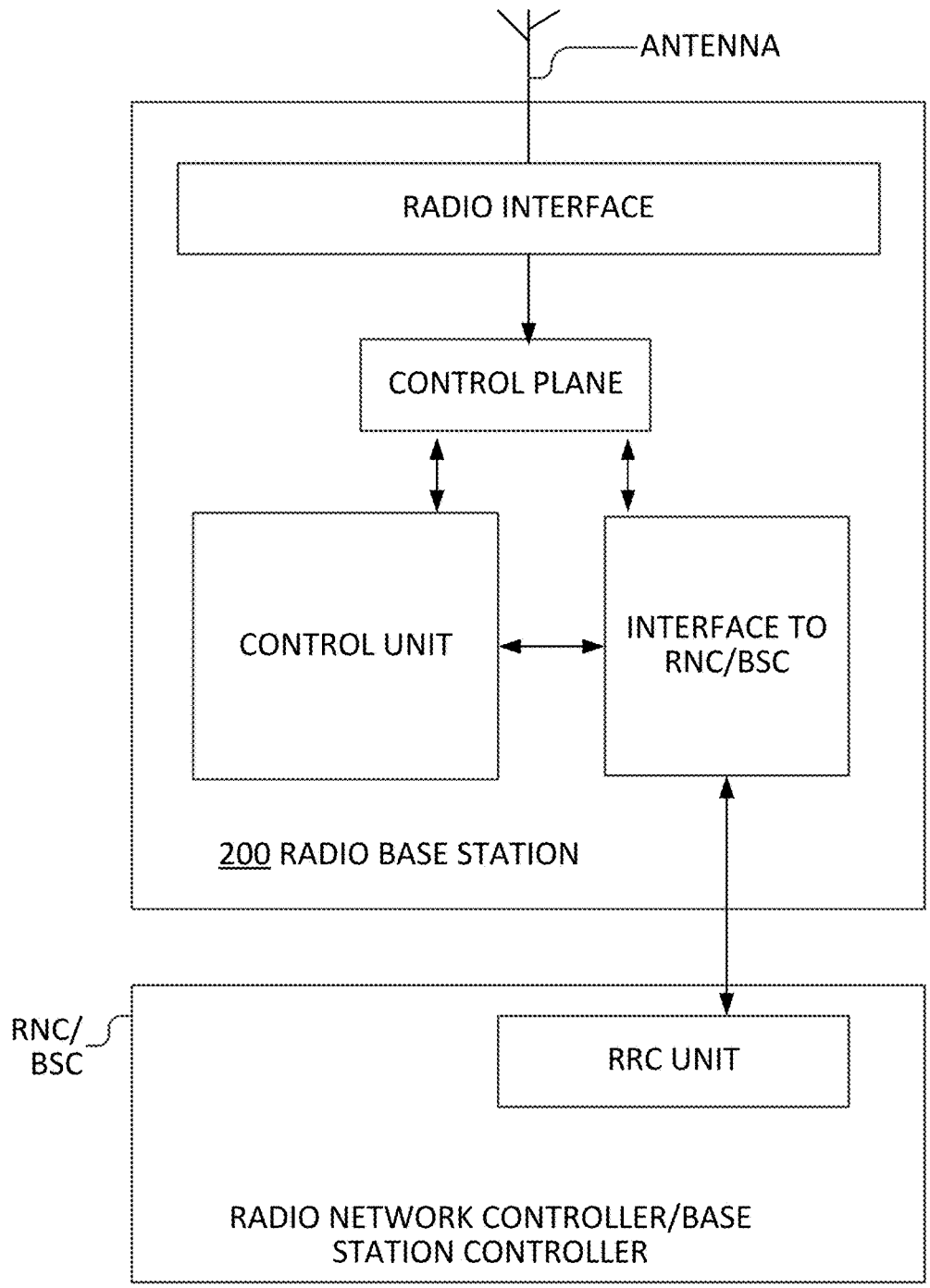
FIG. 16 is a block diagram of a further embodiment of a network node according to the present technology.

With reference to FIG. 15 and FIG. 16, an embodiment of a radio network node such as a radio base station node 200 or radio network controller node 200 according to the proposed technology will be described. The radio network controller node 200 is configured to enable controlling radio access network selection and traffic steering for a user equipment 100 being served by the radio access network controller in a heterogeneous communication network, the user equipment 100 is associated with an ANDSF policy server node 300. The radio network controller node 200 is configured to provide instructions S2 to the connected or idle user equipment 100 enabling the connected or idle user equipment 100 to at least partly suspend any active ANDSF settings, or to at least partly activate previously suspended ANDSF settings.

The control message that instructs the UE to override the ANDSF settings is transmitted from a network node 200 such as a radio base station, RBS, or radio network controller node 200 as is depicted in the box diagram in FIG. 15 and FIG. 16. Alternatively it is transmitted from a WLAN AP, Access Point, and that comprise features relevant for the present teachings and that are the same as depicted in FIG. 15. The generation of the control message is typically triggered by a Radio Resource Control RRC unit. An RBS of the eNodeB type for the LTE, or a WLAN AP, includes the RRC unit, whereas RBS in the form of BTS for GSM/GPRS is connected to a Base Station Controller, BSC, that comprise the RRC unit. Also in UTRA/WCDMA RBS in form of the NodeB connects to a Radio Network Controller RNC that includes the RRC unit. The radio interface and RRC units are operated under control of special purpose units or by processors executing software stored in a memory.

The radio base station 200 may also include radio circuitry for communication with one or more other nodes, including transmitting and/or receiving information.

Figure 17:
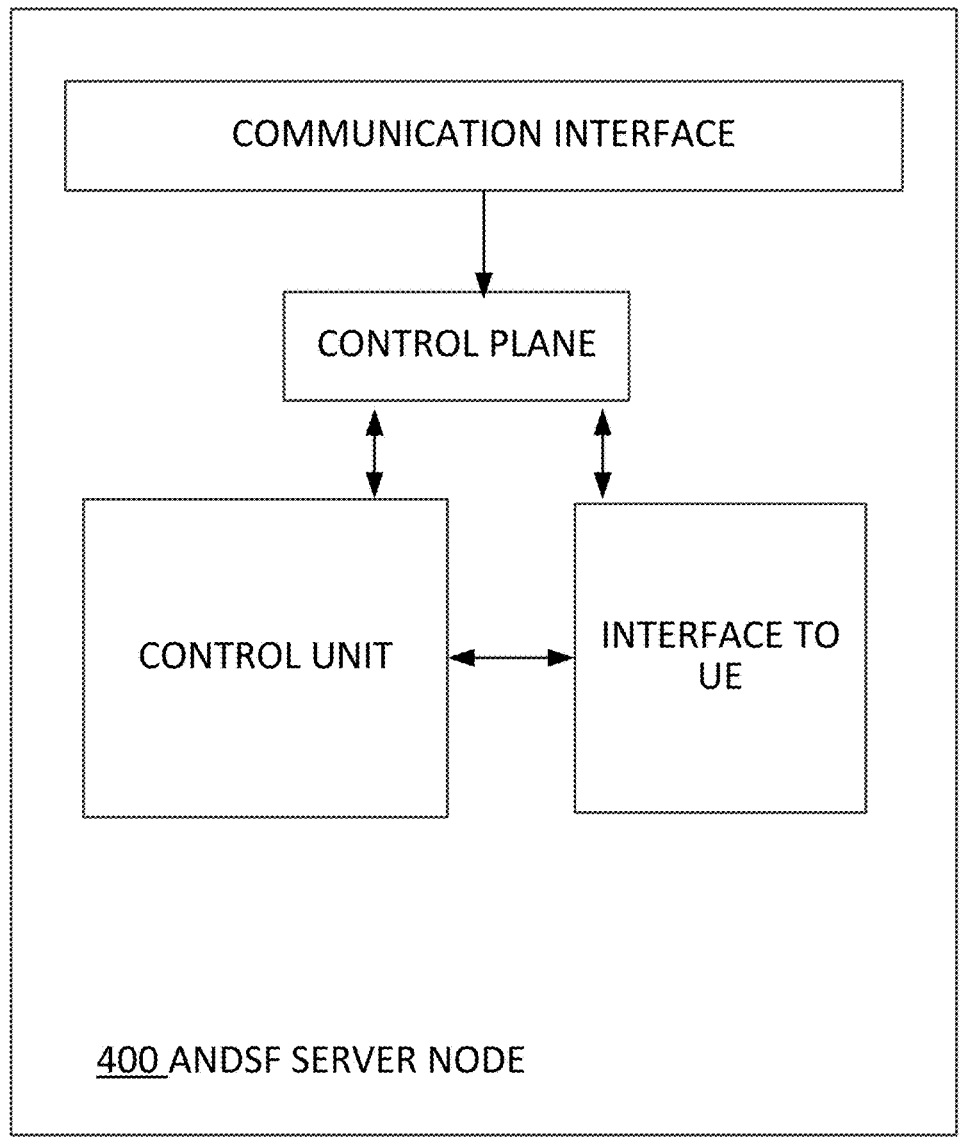
FIG. 17 is a block diagram of an embodiment of an ANDSF policy server node according to the present technology.

With reference to FIG. 17, an embodiment of an ANDSF policy server node 300 according to the proposed technology will be described. The ANDSF policy server node 300 is configured to enable controlling radio access network selection and traffic steering for a user equipment 100 being served by a radio access network controller 200 in a heterogeneous communication network, the user equipment 100 is associated with the ANDSF policy server node 300. The ANDSF policy server node 300 is configured to provide an indication to the user equipment 100 about selected geographical areas in which radio access network selection and traffic steering for the user equipment 100 is controlled by provided ANDSF settings or by the radio access network, the indication enabling the user equipment 100 to adaptively suspend or activate ANDSF settings upon entering the selected geographical areas.

The illustration in FIG. 17 depicts only those parts of the ANDSF policy server node 300 that are involved in the embodiments here disclosed. It comprises communication interface that is adapted for communication with user equipment via a plurality of RAT, including cellular RAT and a non-cellular RAT and that is typically WLAN. The interface is typically constructed for supporting communication via a single switchable type of RAT. The ANDSF policy server node 300 further comprises a user interface adapted for communication with associated user equipment 100, in the heterogeneous communication system, and that is connected to the radio interface, in the figure via a control plane module. The reason is the ANDSF communication is tunneled from the ANDSF server to the UE transparently through the RAN/RAT.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 18:
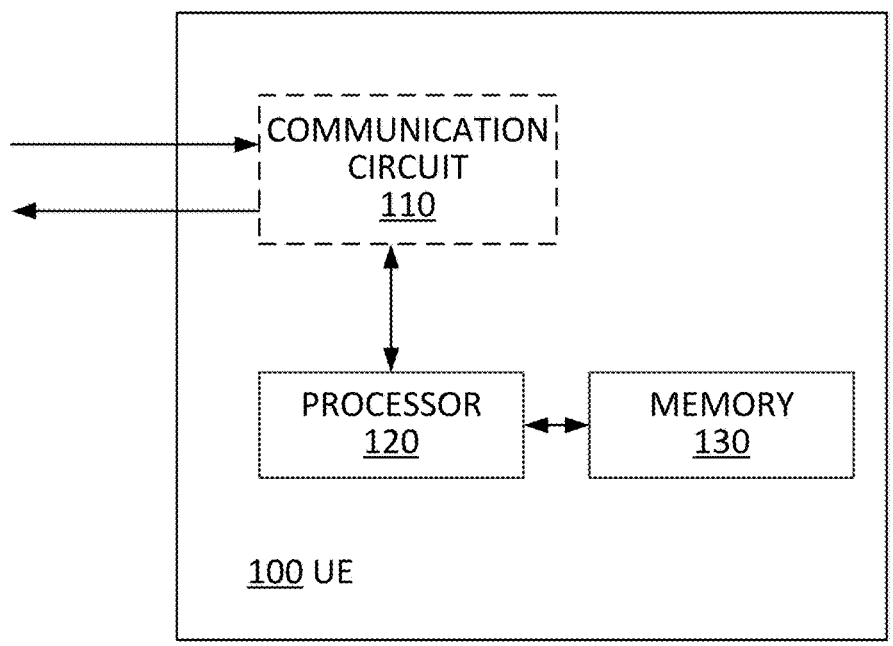
FIG. 18 is a block diagram of an embodiment of a user equipment according to the present technology.

FIG. 18 is a schematic block diagram illustrating an example of a user equipment 100 comprising a processor 120 and an associated memory 130, and a communication circuitry 110. The user equipment 100 is operative to enter a connected mode, and apply selection of radio access network and traffic steering based on received ANDSF settings, and to suspend at least part of said ANDSF settings based on a detected predefined event. Further, the user equipment 100 is operative to receive ANDSF settings from the ANDSF policy server 300, and detect a predefined event.

Figure 19:
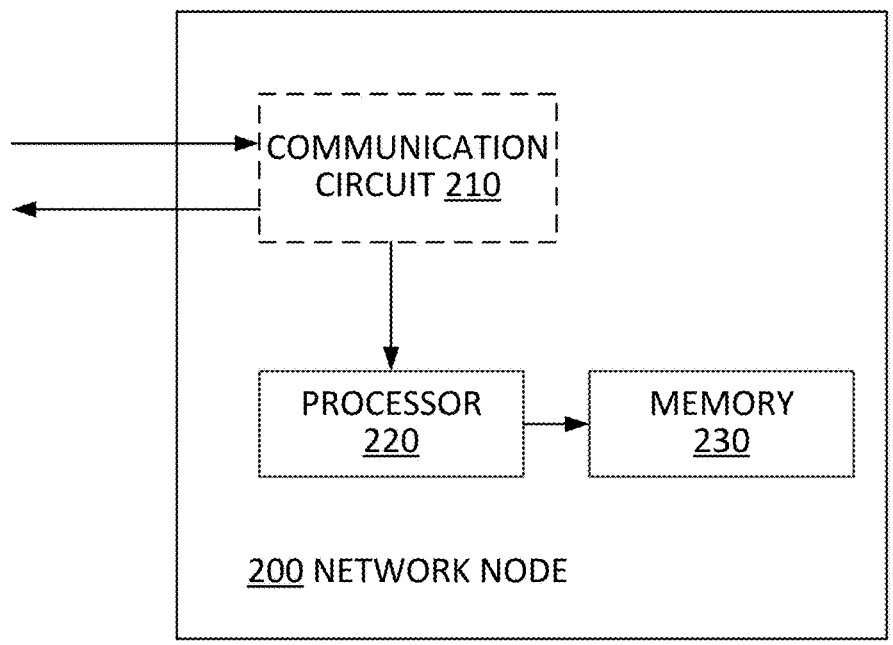
FIG. 19 is a block diagram of a further embodiment of a network node according to the present technology.

FIG. 19 is a schematic block diagram illustrating an example of network node 200, such as a radio base station or radio network control node 200 comprising a processor 220 and an associated memory 230, and a communication circuitry 210. The network node 200 is operative to prepare and provide instructions to be communicated to a connected or idle user equipment 100 enabling the connected or idle user equipment 100 to at least partly suspend any active ANDSF settings, or to at least partly activate previously suspended ANDSF settings. Further, the network node 200 is operative to provide instructions to the connected or idle user equipment 100 enabling said connected or idle user equipment 100 to at least partly suspend any active ANDSF settings, or to at least partly activate previously suspended ANDSF settings.

Figure 20:
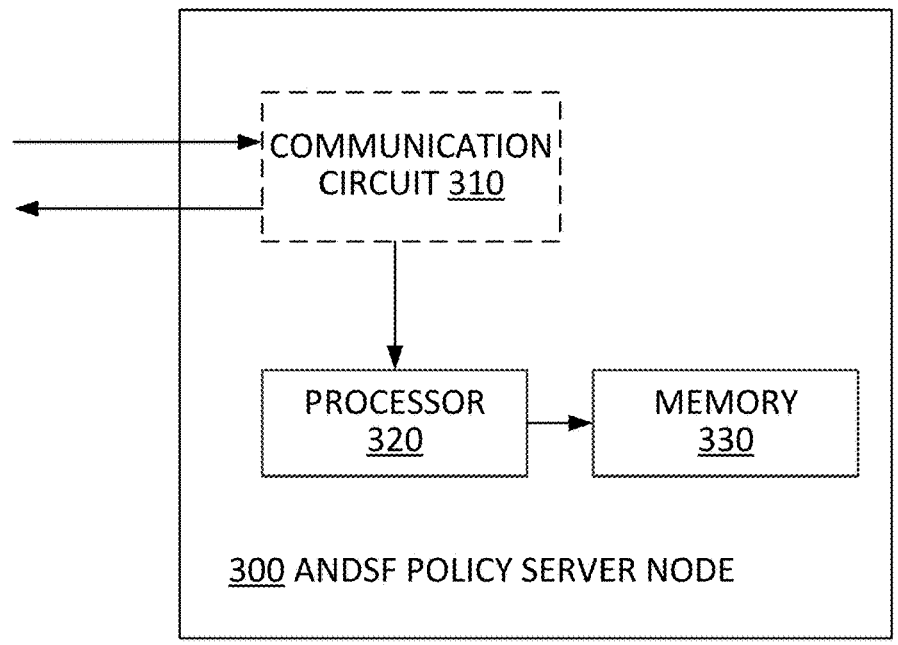
FIG. 20 is a block diagram of an additional embodiment of an ANDSF policy server node according to the present technology.

FIG. 20 is a schematic block diagram illustrating an example of an ANDSF policy server node 300 comprising a processor 320 and an associated memory 330, and a communication circuitry 310. The ANDSF policy server node 300 is operative to prepare an indication to be provided to the user equipment 100 about selected geographical areas in which radio access network selection and traffic steering for the user equipment 100 is controlled by provided ANDSF settings or by the radio access network, the indication enabling the user equipment 100 to adaptively suspend or activate ANDSF settings upon entering the selected geographical areas. Further, the ANDSF policy server node 300 is operative to provide the indication to the user equipment 100 about selected geographical areas in which radio access network selection and traffic steering for the user equipment 100 is controlled by provided ANDSF settings or by the radio access network.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to perform the above described method steps.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding user equipment 100, radio network controller 200, ANDSF policy server node 300 may each be defined as a group of function modules, where each step performed by the processor corresponds to a function module. In this case, the function modules are implemented as a computer program running on the processor. Hence, the user equipment 100, radio network controller 200, and ANDSF policy server node 300 may each alternatively be defined as a group of function modules, where the function modules are implemented as a computer program running on at least one processor.

Figure 22:
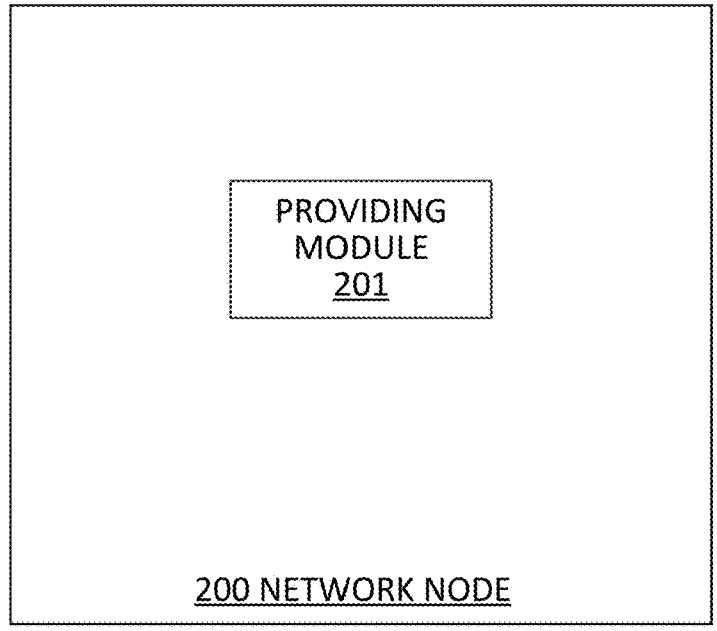
FIG. 22 is functional module diagram of a radio base station according to the present technology.
Figure 23:
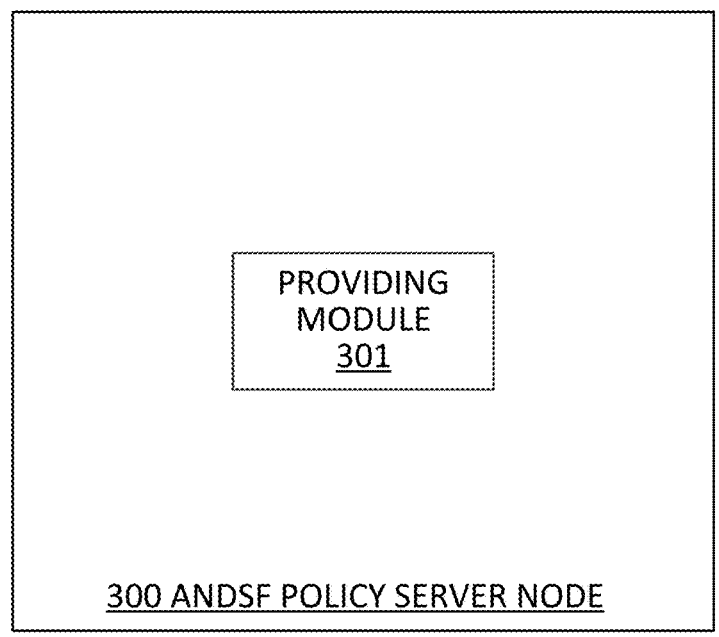
FIG. 23 is a functional module diagram of an ANDSF policy server node according to the present technology.

The computer program residing in memory may thus be organized as appropriate function modules configured to perform, when executed by the processor, at least part of the steps and/or tasks described herein. An example of such function modules is illustrated in FIG. 21, FIG. 22 and FIG. 23.

Figure 21:
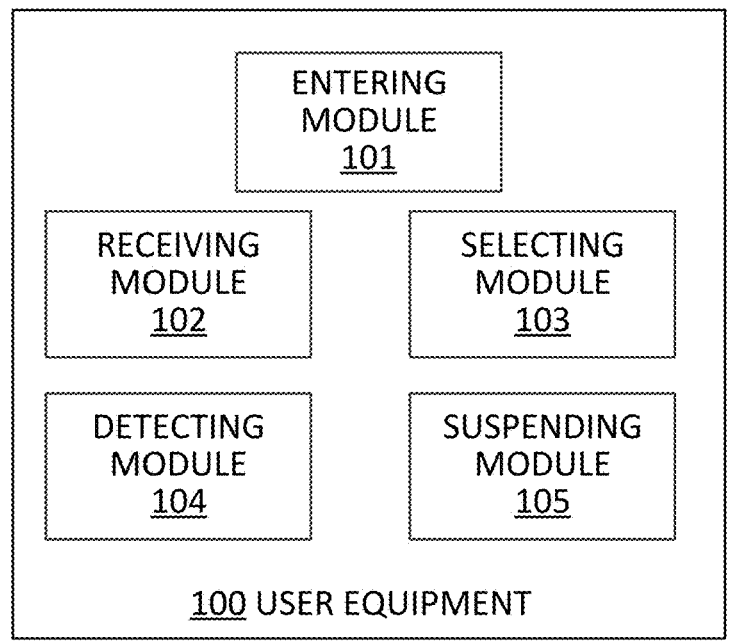
FIG. 21 is a functional module diagram of a user equipment according to the present technology.

FIG. 21 is a schematic block diagram illustrating an example of a user equipment 100 comprising a group of function modules. FIG. 22 is a schematic block diagram illustrating an example of a radio network controller node 200 comprising a group of function modules. FIG. 23 is a schematic block diagram illustrating an example of an ANDSF policy server node 300 comprising a group of function modules.

An advantage gained by the introduction of means for the UE to override the ANDSF settings, in whole or in part, is a more flexible adaptation of the UE mobility than is possible by adjustment of the ANDSF settings in the ANDSF server.

A further advantage is improved conditions for the ANDSF and RAN to co-exist, and as is provided by the proposed mechanisms by which the RAN can take over the role of ANDSF in some specific parts of the network, and for some specific parts of the ANDSF policies.

In particular is desired that the RAN control the ANDSF settings to be overridden by the UE when conditions arise. Such conditions can be load in the RAN and/or load in the WLAN, and any other more dynamic conditions happening in RAN.

Without the solution disclosed herein, the ANDSF rules basically 'run continuously' and may thus take effect at unwanted occasions. Examples of such occasions are, if the network has not implemented IP continuity between 3GPP and WLAN domains, if some ongoing bearers utilize 'Local Breakout'. In these cases the traffic can experience interruptions or be terminated. By the embodiments presented herein, the ANDSF settings that is provided to the UE and that are well adapted for most of the network architecture and situations, may be overridden when network flaws or situations in the networks occurs and that were not dimensioned for when the ANDSF settings were provided to the UE.

A further advantage provided at least by an embodiment presented is that the a cellular network may prevent the UE from changing to a WLAN access while the UE is RRC connected, as could otherwise occur without the cellular systems knowledge and with result of the cellular system would allocate resources in vain for the UE connection.

An advantage provided by another embodiment is the WLAN may prevent the UE from selecting another RAT for a connection that is set up in the WLAN. Keeping the connection in the WLAN, or in the cellular RAT, may be an advantage because of economic or service reasons. One example of a service reason is that the network doesn't support IP continuity between 3GPP and WLAN. The WLAN or cellular RAT/RAN may have information of these reasons and that may apply to one or a limited amount of cells, or WLAN access points, and that may be of temporary nature.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by a user equipment for controlling radio access network selection and traffic steering for the user equipment in a heterogeneous communication network, said communication network comprising at least said user equipment, at least one radio access network controller node and at least one Access Network Discovery and Selection Function (ANDSF) policy server node with which the user equipment is associated, wherein the method comprises the steps of:

adaptively at least partly suspending or activating provided ANDSF policies to enable switching between radio access network control or ANDSF policy control of radio access network selection and traffic steering for said user equipment, wherein at a predefined event the ANDSF policies are partly suspended;

entering a connected mode;

receiving ANDSF settings from said ANDSF policy server node;

applying selection of radio access network (RAN) and/or radio access technology (RAT) based on said received ANDSF settings;

configuring selection of radio access network (RAN) and/or radio access technology (RAT) by overriding said received ANDSF settings;

detecting the predefined event, wherein said predefined event comprises said user equipment entering a predetermined geographical area or cell, and said user equipment retrieving an indication from said ANDSF policy server node, said indication providing information relating to if the radio access network selection and traffic steering for a user equipment is controlled by the radio access network node or the provided ANDSF settings for said predetermined geographical area, and said user equipment suspending or activating ANDSF settings in said predetermined geographical area based on said indication;

suspending at least part of said received ANDSF settings based on said detected predefined event;

setting a timer in response to detecting said predefined event; and monitoring said timer and activating said suspended ANDSF settings by said monitoring step when said timer reaches a predetermined value.

2. The method according to claim 1, comprising the further steps of:

monitoring said predefined event, and controlling suspending or activating ANDSF settings based on said monitoring.

3. The method according to claim 1, wherein said predefined event comprises said user equipment entering a predetermined mode such as a RRC connected mode in 3GPP or Associated in WLAN.

4. The method according to claim 1, wherein said detection of said predefined event is radio access network triggered.

5. The method according to claim 4, wherein said predefined event comprises said user equipment receiving a dedicated message from a radio base station causing suspension or activation of said ANDSF settings.

6. The method according to claim 4, wherein said predefined event comprises said user equipment receiving a broadcast message from said radio access network controller node on a monitored broadcast channel, causing suspension or activation of said received ANDSF settings.

7. The method according to claim 1, wherein said detection of said predefined event is ANDSF triggered.

8. The method according to claim 1, wherein said provided ANDSF settings are only suspended for access selection but maintained active for traffic steering.

9. A method performed by a network node for enabling controlling radio access network selection and traffic steering for a user equipment served by a radio access network controller node in a heterogeneous communication network, wherein said method comprises the steps of:

preparing and providing instructions to a connected user equipment enabling said connected user equipment to at least partly suspend any active Access Network Discovery and Selection Function (ANDSF) settings, or to at least partly activate previously suspended ANDSF settings, wherein the instructions enable the connected user equipment to at a predefined event partly suspend the ANDSF settings;

wherein said predefined event comprises said user equipment entering a predetermined geographical area or cell, and said user equipment retrieving an indication from said ANDSF policy server node, said indication providing information relating to if the radio access network selection and traffic steering for a user equipment is controlled by the radio access network node or the provided ANDSF settings for said predetermined geographical area, and said user equipment suspending or activating ANDSF settings in said predetermined geographical area based on said indication;

wherein at the predefined event the ANDSF settings are to be partly suspended by the connected user equipment such that only the ANDSF settings concerning the radio access network selection which includes Radio Access Network (RAN) and Radio Access Technology (RAT) selection are suspended where the radio access network controller rather than an ANDS policy server node has control of the RAN/RAT selection, and wherein the partly suspended ANDSF policies does not include traffic steering where the radio access network controller has control of the RAN/RAT selection and the ANDSF policy server node has control of the traffic steering.

10. The method according to claim 9, wherein providing said instructions comprising transmitting a dedicated message to said user equipment.

11. The method according to claim 9, wherein providing said instructions comprising transmitting a network broadcast message within a cell in which the user equipment is located.

12. A method performed by an Access Network Discovery and Selection Function (ANDSF) policy server node for enabling controlling radio access network selection and traffic steering for a user equipment being served by a radio access network controller in a heterogeneous communication network, said user equipment being associated with an ANDSF policy server node, and wherein said method comprises the steps of:

preparing and providing an indication to said user equipment about selected geographical areas in which radio access network selection and traffic steering for said user equipment is controlled by provided ANDSF settings or by the radio access network, said indication enabling said user equipment to adaptively suspend or activate ANDSF settings upon entering said selected geographical areas, wherein said indication enabling said user equipment to partly suspend the ANDSF settings at a predefined event including entering said selected geographical areas; wherein said predefined event comprises said user equipment entering a predetermined geographical area or cell, and said user equipment retrieving an indication from said ANDSF policy server node, said indication providing information relating to if the radio access network selection and traffic steering for a user equipment is controlled by the radio access network node or the provided ANDSF settings for said predetermined geographical area, and said user equipment suspending or activating ANDSF settings in said predetermined geographical area based on said indication; wherein at the predefined event the ANDSF settings are partly suspended such that only the ANDSF settings concerning the radio access network selection which includes Radio Access Network (RAN) and Radio Access Technology (RAT) are suspended where the radio access network controller rather than the ANDS policy server node has control of the RAN/RAT selection, and wherein the partly suspended ANDSF policies does not include traffic steering where the radio access network controller has control of the RAN/RAT selection and the ANDSF policy server node has control of the traffic steering.

13. A user equipment comprising:

a processor; and a memory, said memory comprising instructions executable by the processor, whereby the processor is operative to adaptively at least partly suspend or activate provided Access Network Discovery and Selection Function (ANDSF) policies to enable switching between radio access network control or ANDSF policy control of radio access network selection and traffic steering for said user equipment, wherein at a predefined event the ANDSF policies are partly suspended; wherein said predefined event comprises said user equipment entering a predetermined geographical area or cell, and said user equipment retrieving an indication from said ANDSF policy server node, said indication providing information relating to if the radio access network selection and traffic steering for a user equipment is controlled by the radio access network node or the provided ANDSF settings for said predetermined geographical area, and said user equipment suspending or activating ANDSF settings in said predetermined geographical area based on said indication; wherein at the predefined event the ANDSF policies are partly suspended such that only the ANDSF policies concerning the radio access network selection which includes Radio Access Network (RAN) and Radio Access Technology (RAT) selection are suspended where a radio access network controller rather than an ANDS policy server node has control of the RAN/RAT selection, and wherein the partly suspended ANDSF policies does not include traffic steering where the radio access network controller has control of the RAN/RAT selection and the ANDSF policy server node has control of the traffic steering.

14. The user equipment of claim 13, wherein said user equipment is further operative to:
 enter a connected mode;
 receive ANDSF settings from said ANDSF policy server;
 apply selection of radio access network (RAN) and/or radio access technology (RAT) based on said received ANDSF settings;
 detect the predefined event; and
 suspend at least part of said received ANDSF settings based on said detected predefined event.

15. The user equipment of claim 13, wherein the user equipment is further operative to enter a connected mode, and apply selection of radio access network (RAN) and/or radio access technology (RAT) based on received ANDSF settings, and to suspend at least part of said ANDSF settings based on the detected predefined event.

16. The method according to claim 1, wherein at the predefined event the ANDSF policies are partly suspended such that only the ANDSF policies concerning the radio access network selection which includes Radio Access Network (RAN) and Radio Access Technology (RAT) selection are suspended where the radio access network controller rather than the ANDSF policy server node has control of the RAN/RAT selection, and wherein the partly suspended ANDSF policies does not include traffic steering where the radio access network controller has control of the RAN/RAT selection and the ANDSF policy server node has control of the traffic steering.

* * * * *